Dec. 10, 1935.  E. H. McCLOUD  2,023,691
AIRPLANE HANGAR DOOR FOR NAVAL CRUISERS
Filed Nov. 13, 1933  22 Sheets-Sheet 1

Inventor
EDWARD H. McCLOUD,
Toulmin & Toulmin
Attorneys

Dec. 10, 1935.  E. H. McCLOUD  2,023,691
AIRPLANE HANGAR DOOR FOR NAVAL CRUISERS
Filed Nov. 13, 1933  22 Sheets-Sheet 3

EDWARD H. McCLOUD, Inventor
Toulmin & Toulmin
Attorneys

Dec. 10, 1935.　　　　E. H. McCLOUD　　　　2,023,691
AIRPLANE HANGAR DOOR FOR NAVAL CRUISERS
Filed Nov. 13, 1933　　22 Sheets-Sheet 4

Inventor
EDWARD H. McCLOUD,
Toulmin & Toulmin
Attorneys

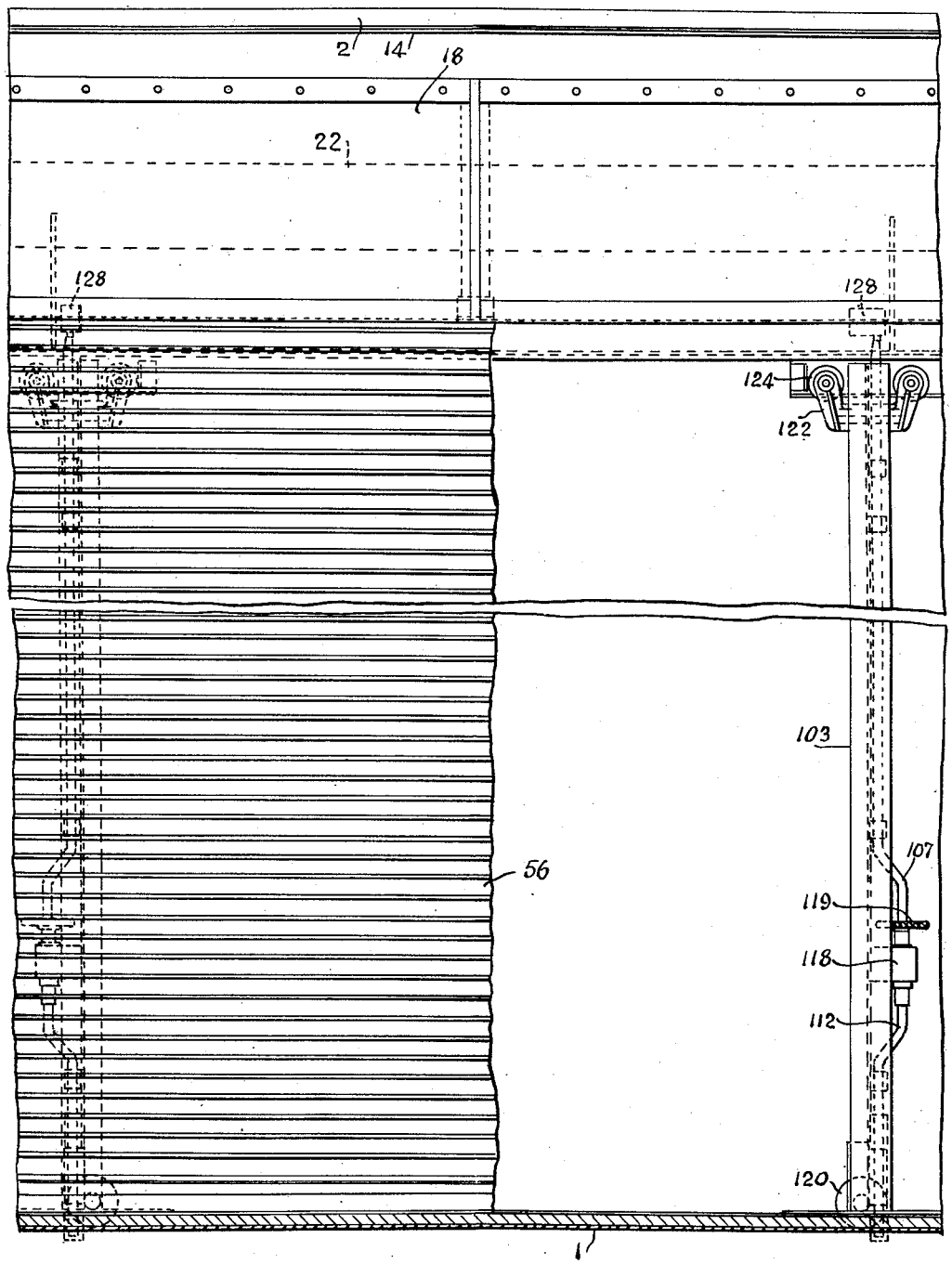

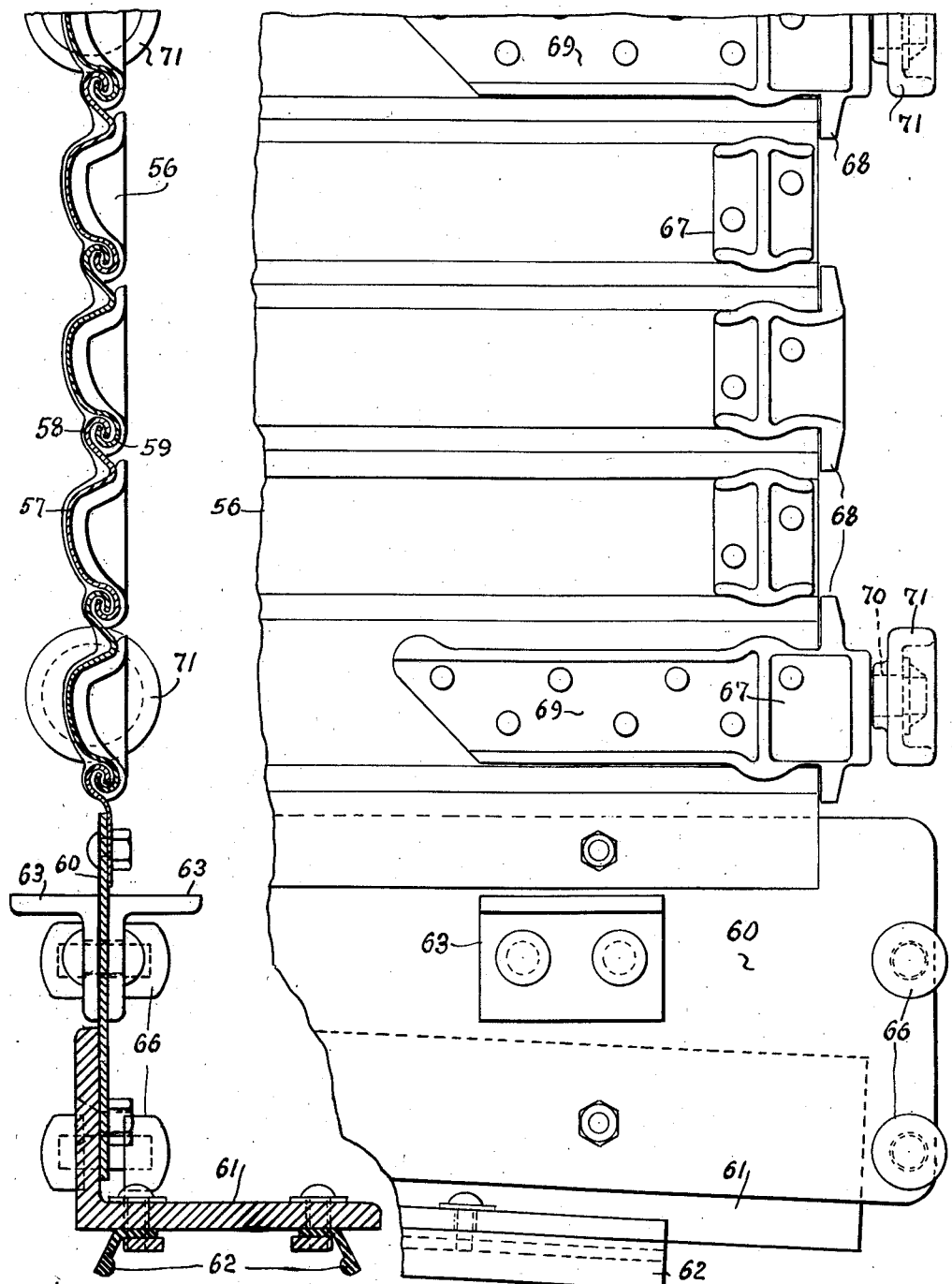

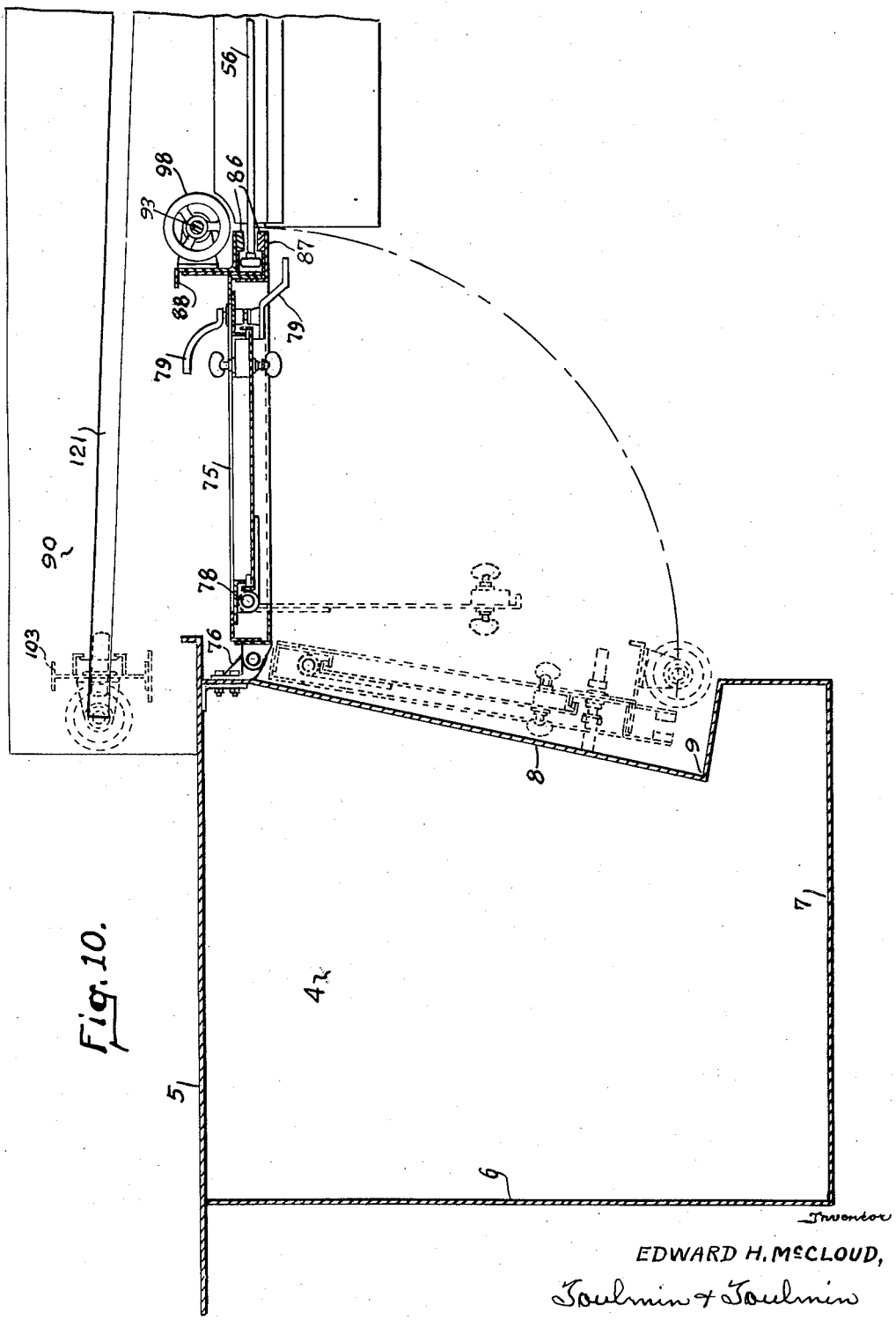

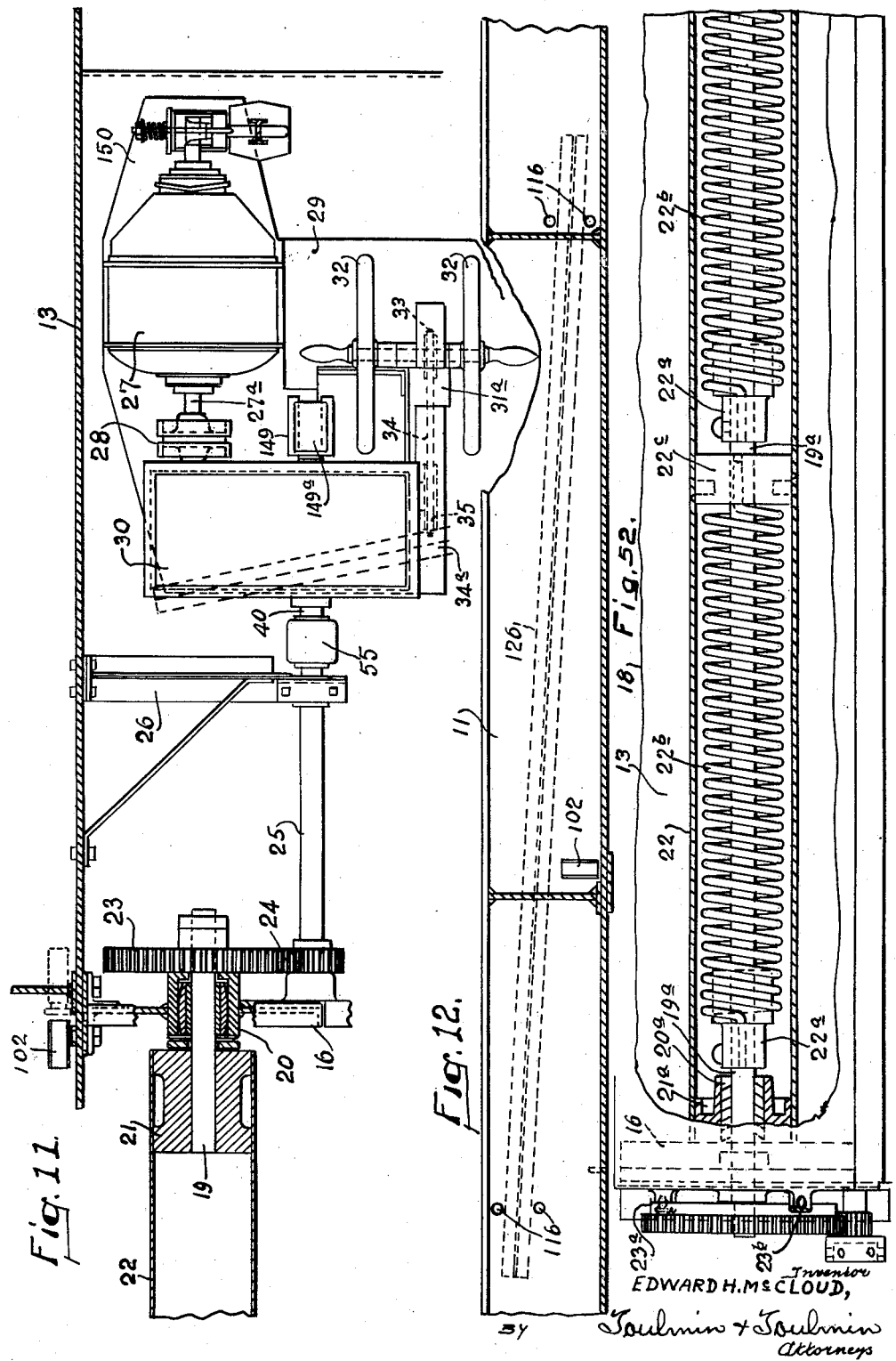

Dec. 10, 1935.  E. H. McCLOUD  2,023,691
AIRPLANE HANGAR DOOR FOR NAVAL CRUISERS
Filed Nov. 13, 1933  22 Sheets-Sheet 9
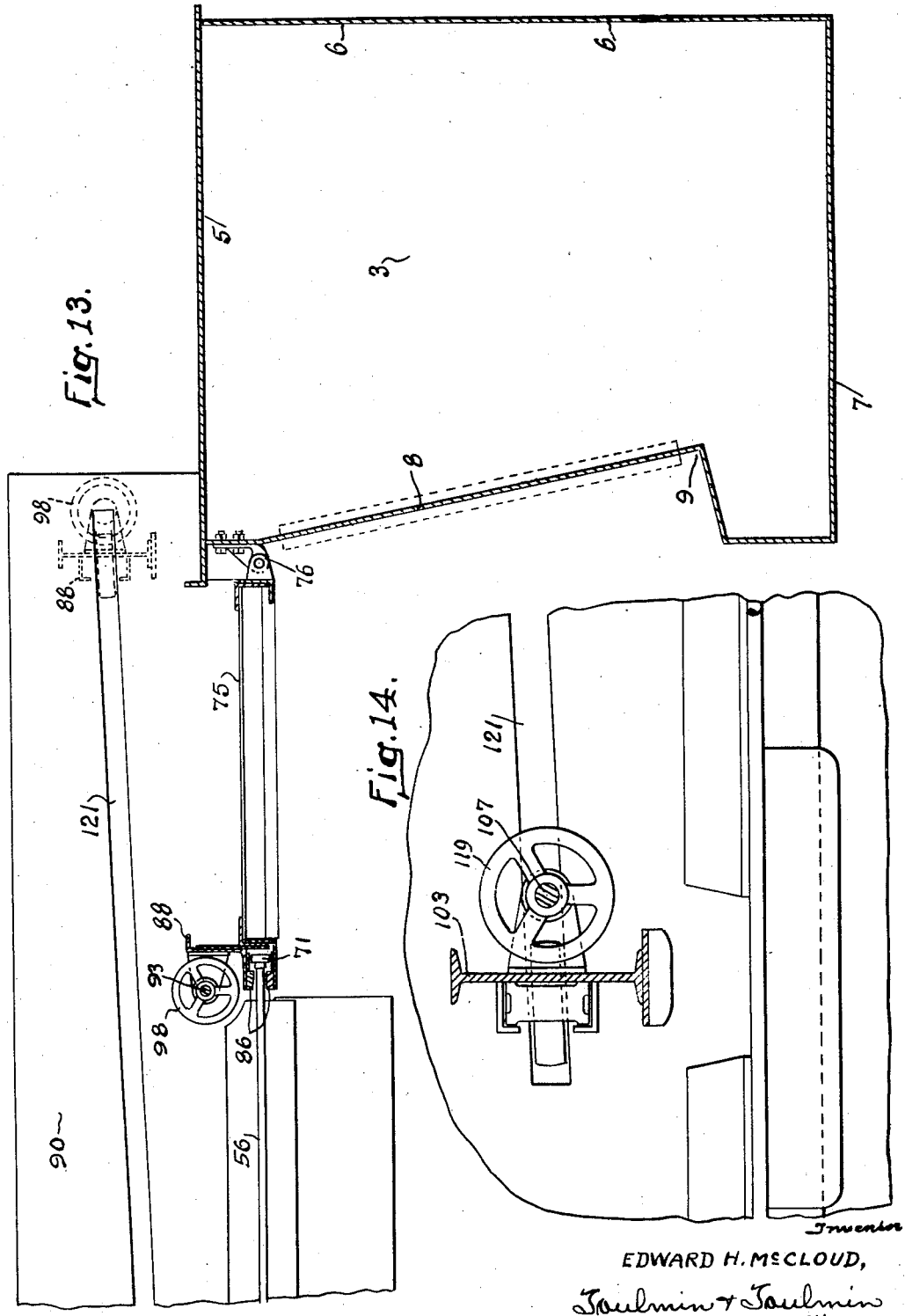
EDWARD H. McCLOUD,

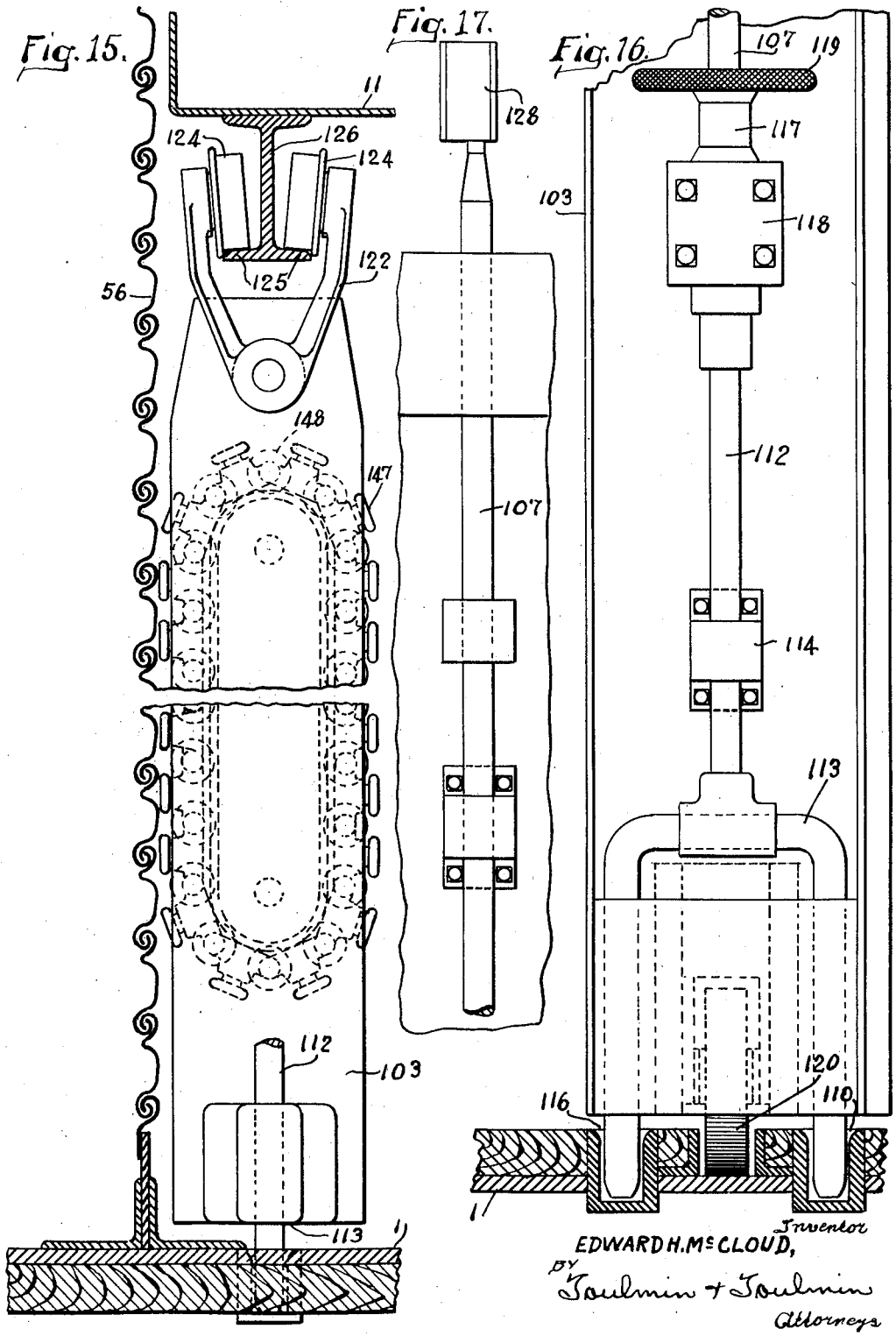

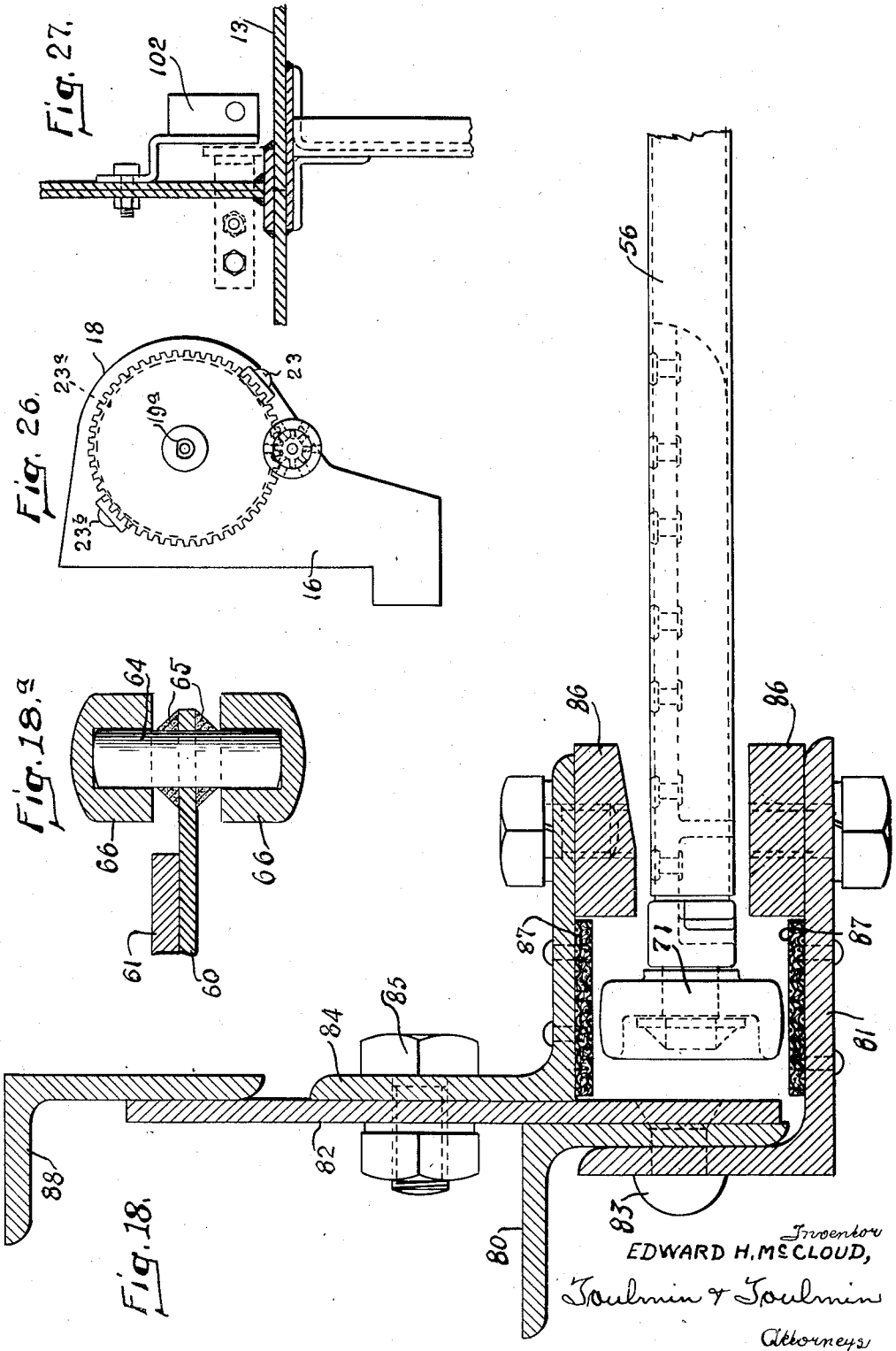

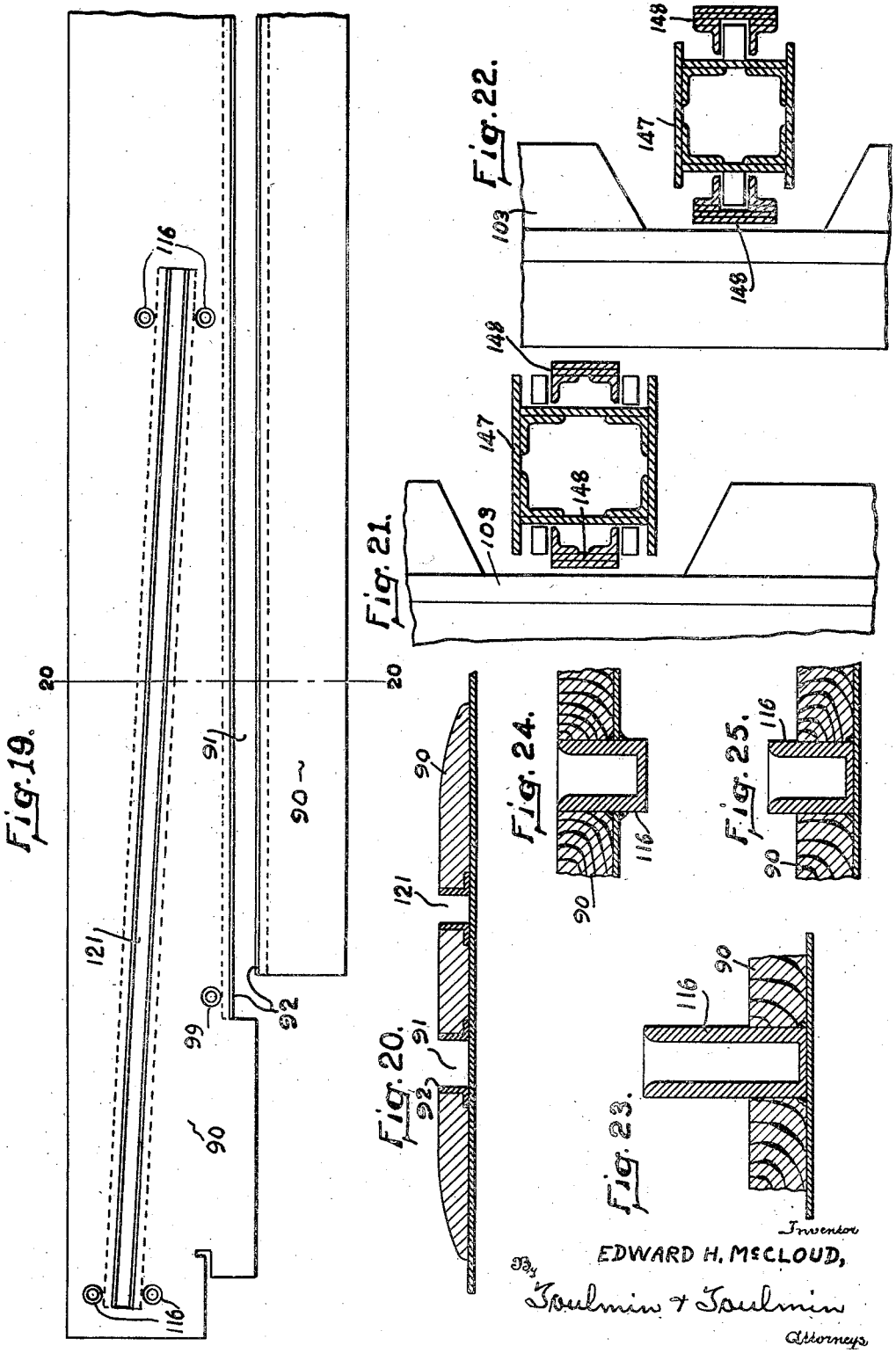

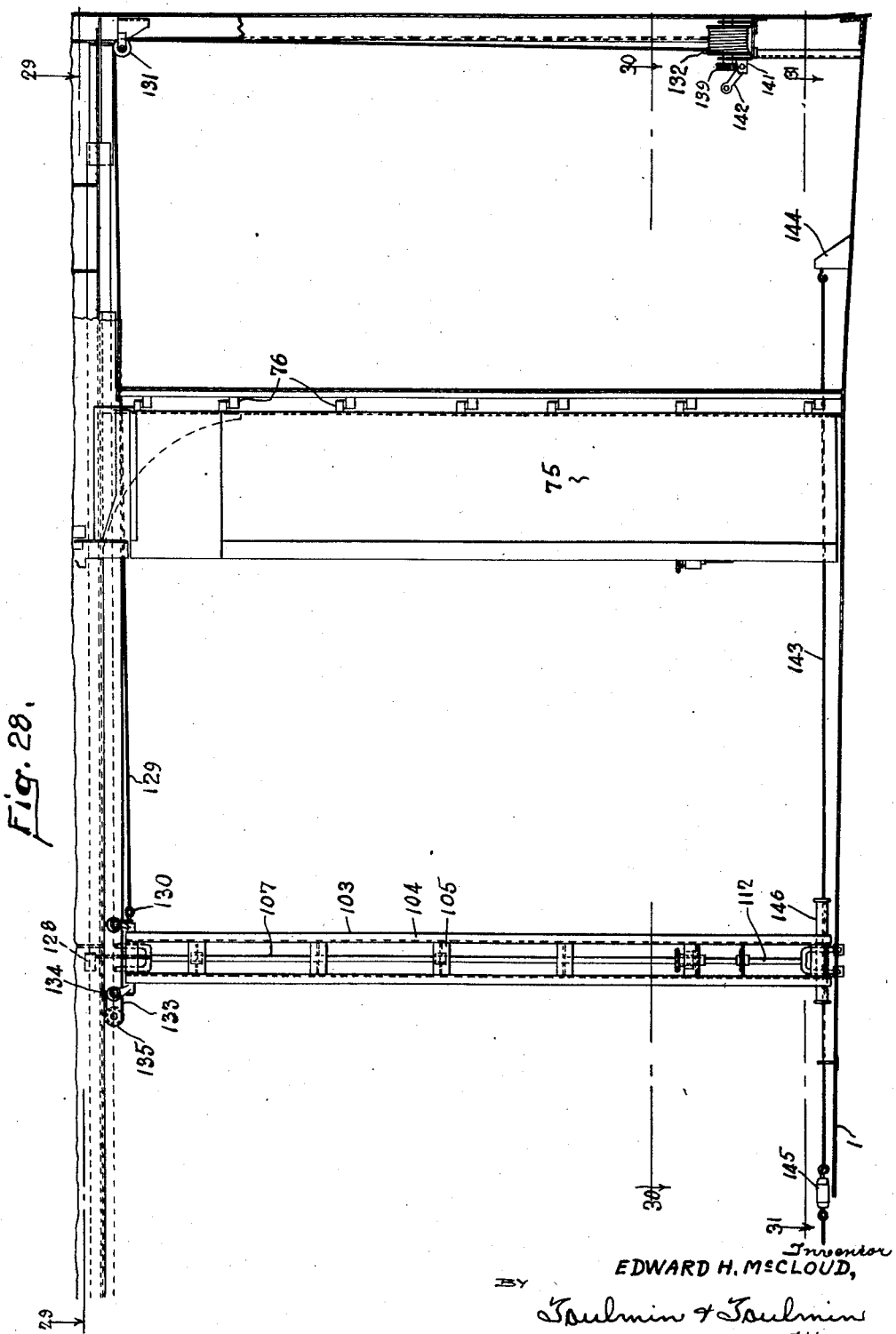

Dec. 10, 1935.  E. H. McCLOUD  2,023,691
AIRPLANE HANGAR DOOR FOR NAVAL CRUISERS
Filed Nov. 13, 1933  22 Sheets-Sheet 14
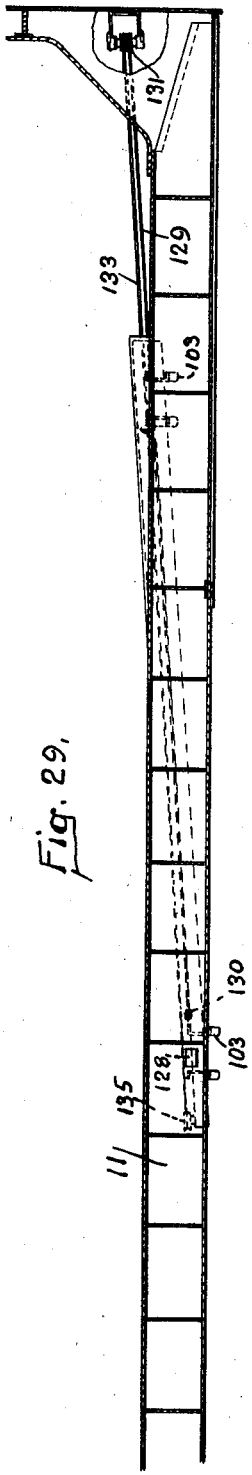
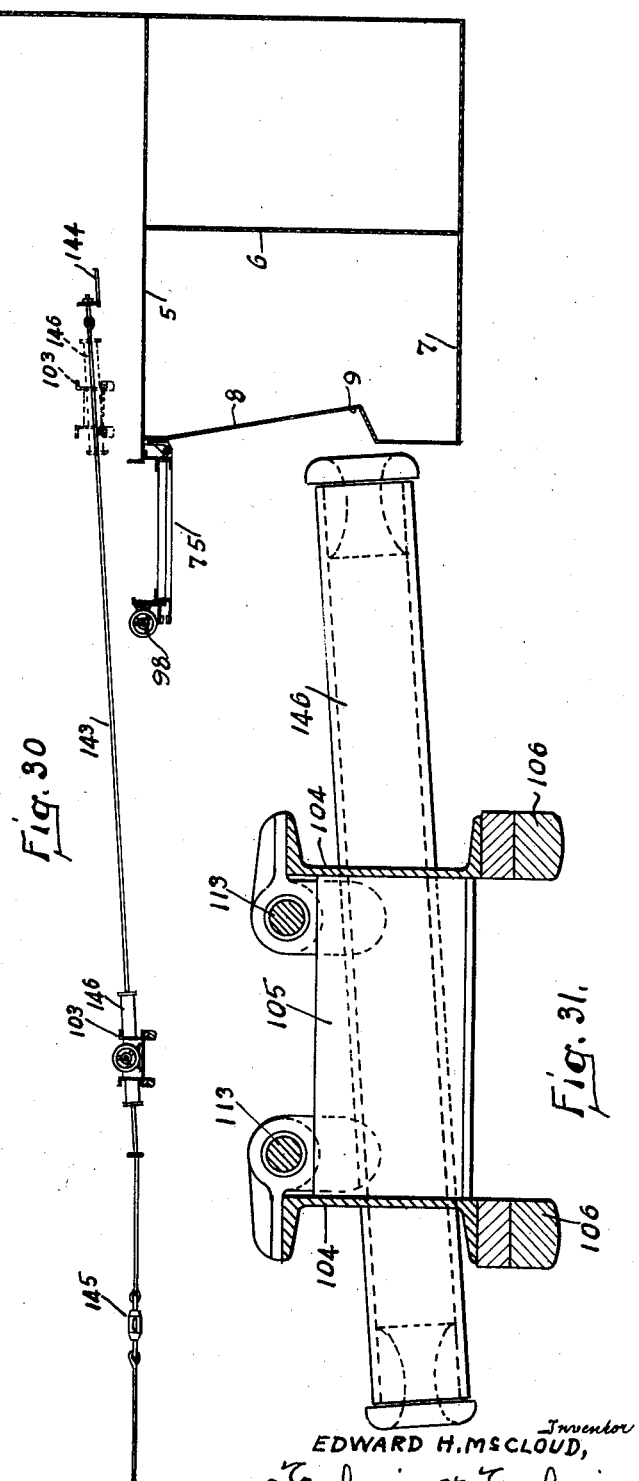
EDWARD H. McCLOUD, Inventor
Toulmin & Toulmin
Attorneys Dec. 10, 1935.  E. H. McCLOUD  2,023,691
AIRPLANE HANGAR DOOR FOR NAVAL CRUISERS
Filed Nov. 13, 1933  22 Sheets-Sheet 15
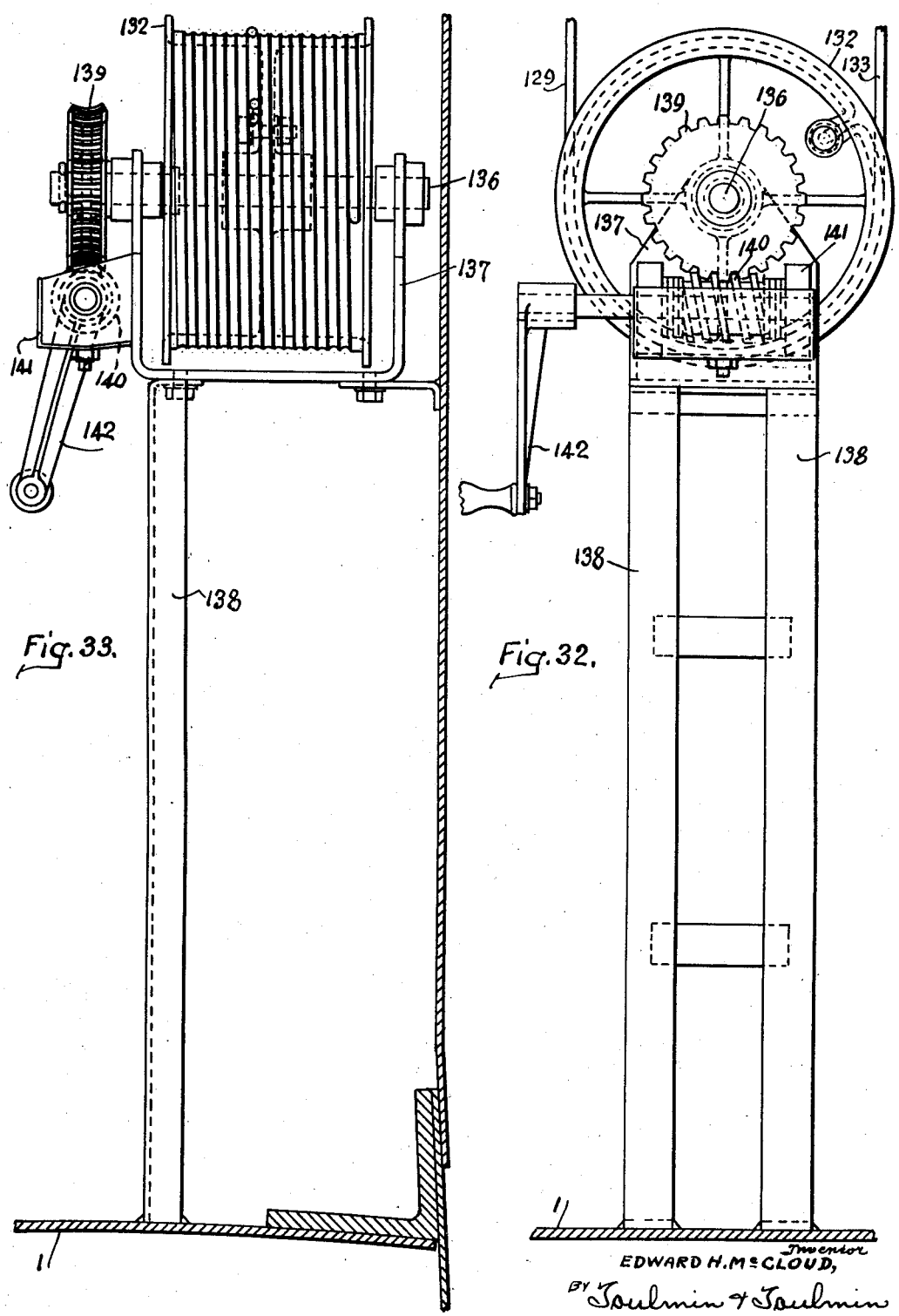
EDWARD H. McCLOUD,
BY Toulmin & Toulmin
Attorneys Dec. 10, 1935.  E. H. McCLOUD  2,023,691

AIRPLANE HANGAR DOOR FOR NAVAL CRUISERS

Filed Nov. 13, 1933  22 Sheets-Sheet 16

Inventor
EDWARD H. McCLOUD,
BY Toulmin & Toulmin
Attorneys

Dec. 10, 1935.  E. H. McCLOUD  2,023,691
AIRPLANE HANGAR DOOR FOR NAVAL CRUISERS
Filed Nov. 13, 1933  22 Sheets-Sheet 17
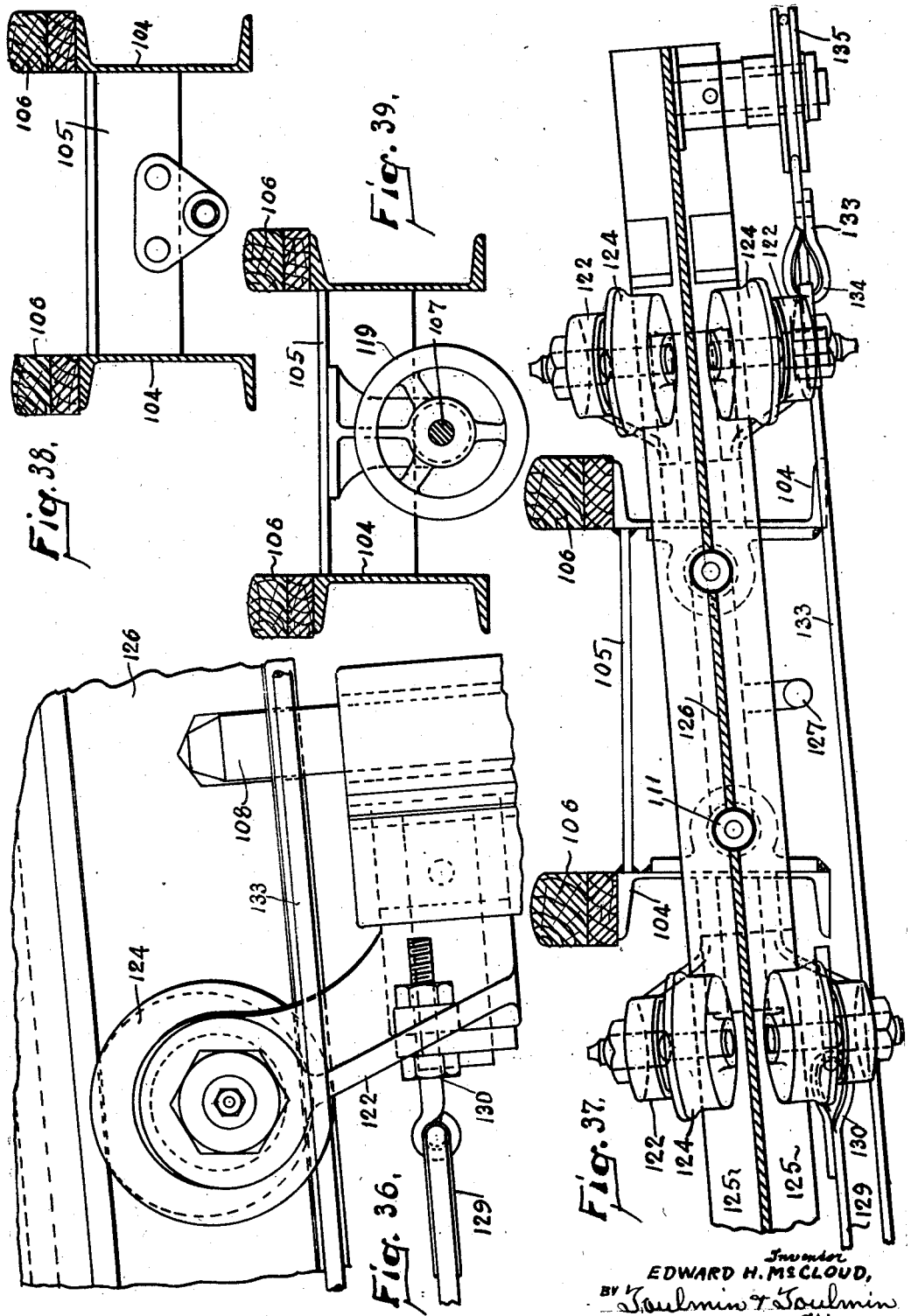
Inventor
EDWARD H. McCLOUD,
BY Toulmin & Toulmin
Attorneys

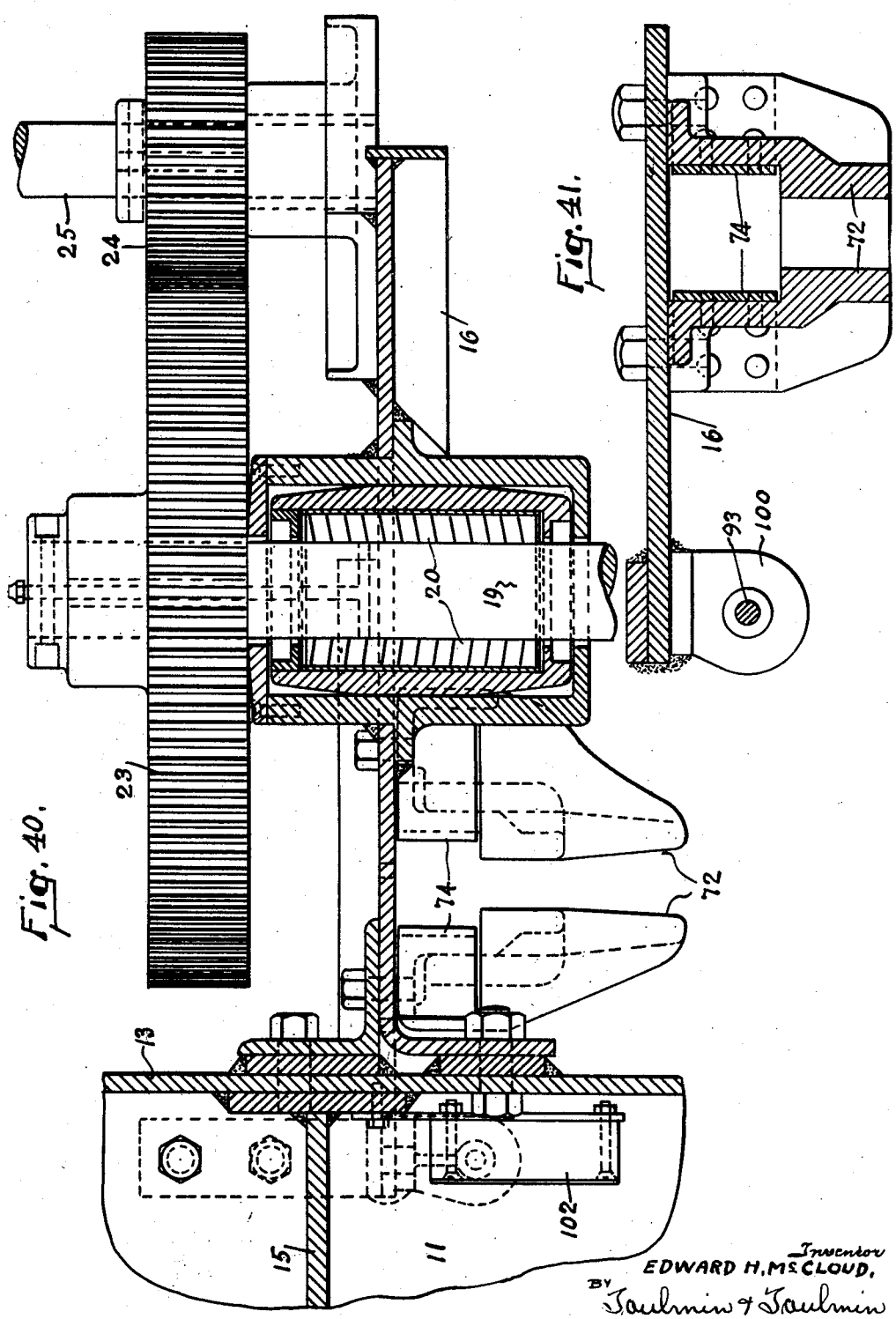

Dec. 10, 1935.　　　　E. H. McCLOUD　　　　2,023,691
AIRPLANE HANGAR DOOR FOR NAVAL CRUISERS
Filed Nov. 13, 1933　　　22 Sheets-Sheet 19
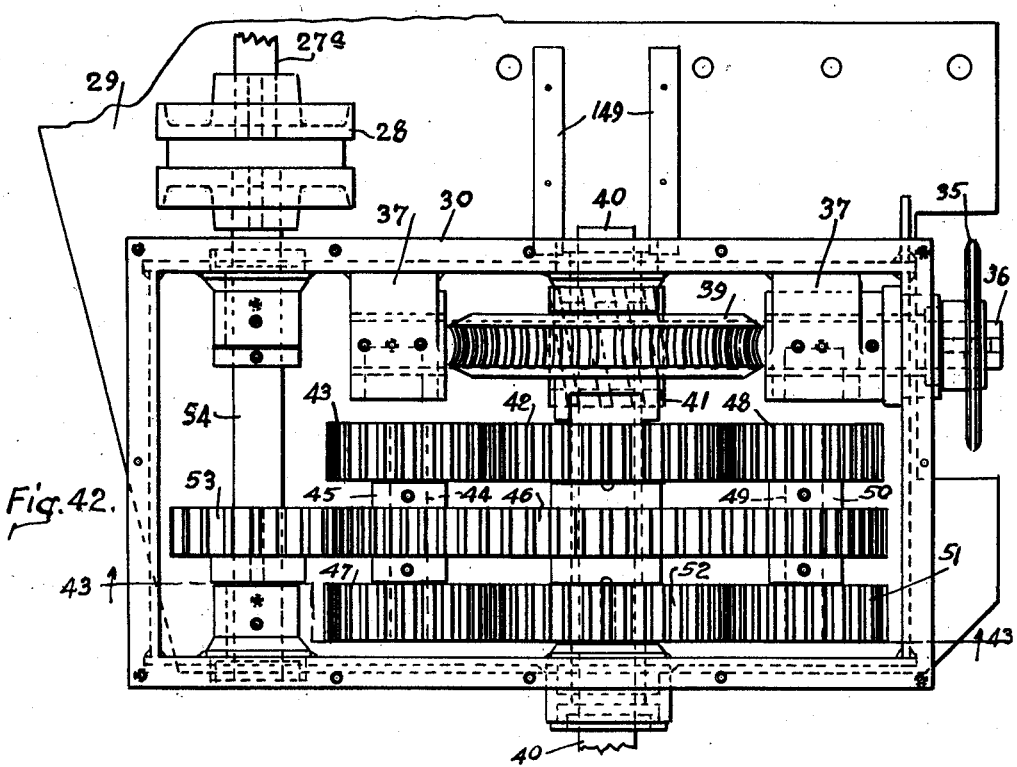
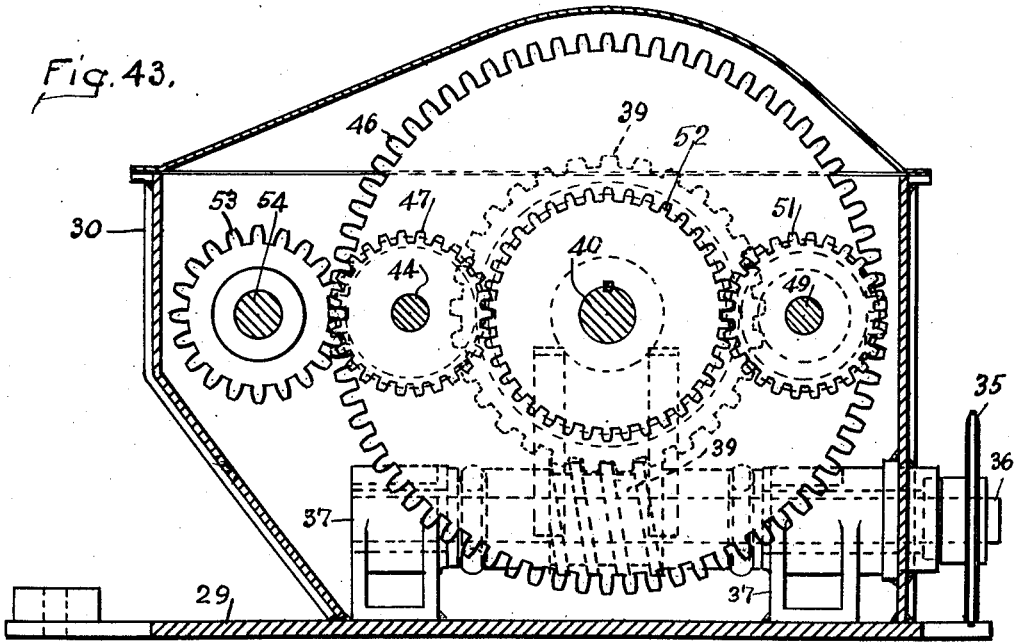
Inventor
EDWARD H. McCLOUD,
BY Toulmin & Toulmin
Attorneys Dec. 10, 1935.  E. H. McCLOUD  2,023,691
AIRPLANE HANGAR DOOR FOR NAVAL CRUISERS
Filed Nov. 13, 1933  22 Sheets-Sheet 20

Inventor
EDWARD H. McCLOUD,
By Toulmin & Toulmin
Attorneys

Dec. 10, 1935.  E. H. McCLOUD  2,023,691
AIRPLANE HANGAR DOOR FOR NAVAL CRUISERS
Filed Nov. 13, 1933  22 Sheets-Sheet 21
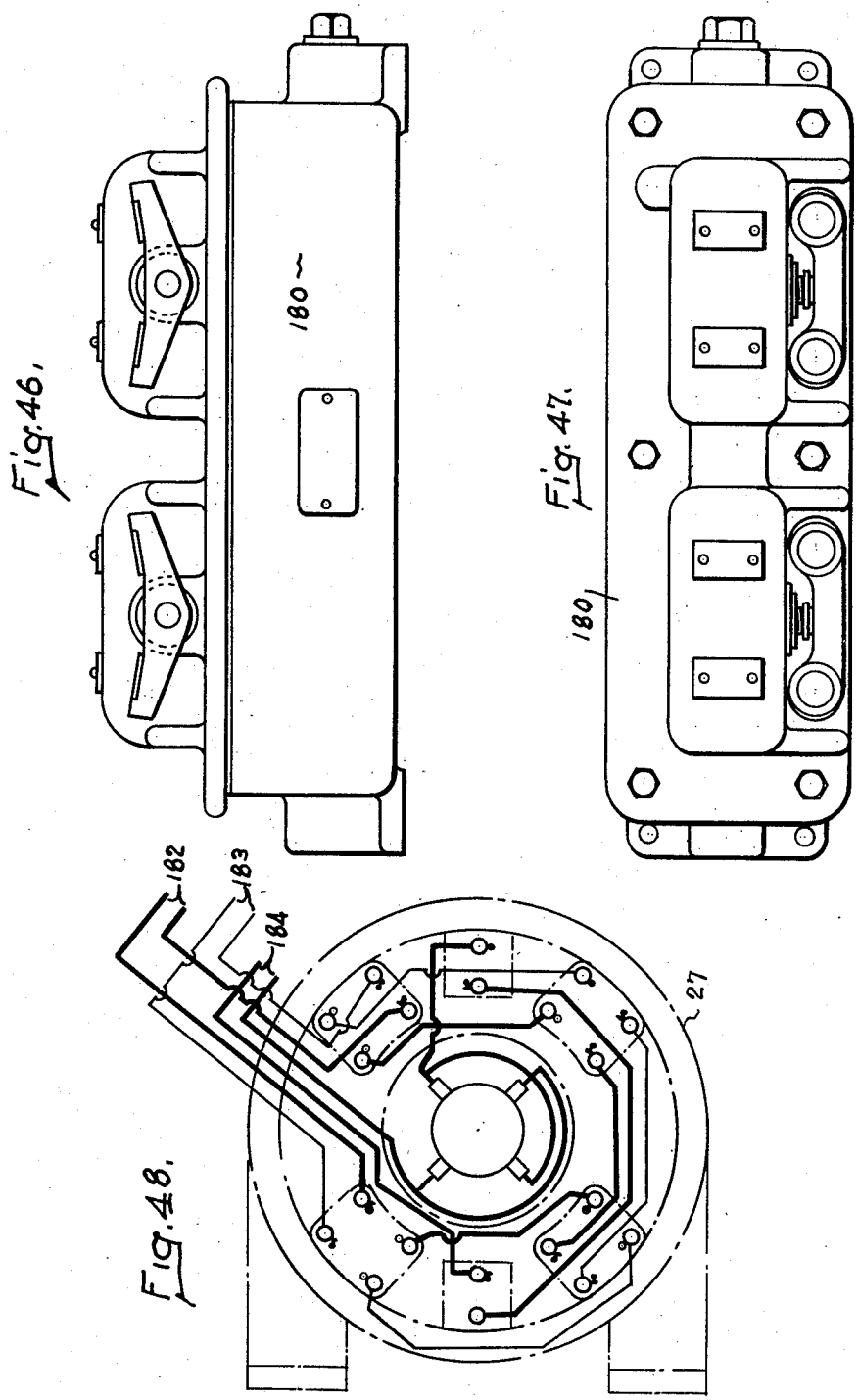
Inventor
EDWARD H. McCLOUD,
BY Toulmin + Toulmin
Attorneys Dec. 10, 1935.                E. H. McCLOUD                2,023,691
                   AIRPLANE HANGAR DOOR FOR NAVAL CRUISERS
                   Filed Nov. 13, 1933           22 Sheets-Sheet 22

Inventor
EDWARD H. McCLOUD,
By Toulmin & Toulmin
Attorneys.

Patented Dec. 10, 1935

2,023,691

UNITED STATES PATENT OFFICE 2,023,691

AIRPLANE HANGAR DOOR FOR NAVAL CRUISERS

Edward H. McCloud, Columbus, Ohio, assignor to General Door Company, Reno, Nev., a corporation of Nevada Application November 13, 1933, Serial No. 697,813

42 Claims. (Cl. 189—57)

This invention relates to improvements in airplane hangars, but more particularly to improvements in airplane hangars for use in naval cruisers, and has for its object to provide, in connection with a hangar, a door which is supported for easy movement and for that purpose is provided on its lateral edges with anti-friction rollers.

It is an object of this invention to provide, in connection with doors for airplane hangars, means to prevent the door from being forced into the hangar as the result of high wind pressure. This means consists of one or more removable posts supported for movement transverse the doorway and adapted to be positioned to be engaged by the door to strengthen the door against wind pressure.

It is also an object of this invention to provide, in connection with an airplane hangar door, means for elevating the door and means to lock said elevating means against operation until all door guiding parts and supporting elements are in position.

It is also an object of the invention to provide, in connection with a hangar door, a plurality of removable panels adapted in one position to provide guides for the door and in other positions to increase the extent of the doorway. The door is in the form of a curtain.

It is a further object of the invention to provide, in connection with airplane hangar doors, mullions or posts adapted to be placed across the doorway for supporting the door, and having thereon anti-friction means so that the presence of the post or mullion will not interfere with the hoisting and lowering of the door.

It is an object to provide, in connection with door-supporting posts or mullions, a safety switch which will prevent the operation of the power mechanism until the post is in proper position for supporting the door.

It is a further object to provide, in connection with swinging panels or lateral doors, means for cutting off the power until the panels are properly positioned for guiding the door.

It is my object to provide a single steel rolling curtain with hinged panels at each side, the panels carrying grooves for the edges of the curtain and posts which are supported by overhead tracks, and may be moved to either side of the opening when the door is cleared when the curtain is lifted, or may be moved into a position behind the curtain and locked in that position so as to prevent the curtain from being blown inwardly.

It is a further object to have anti-friction devices, such as hardwood paraffined strips, mounted on these posts in the form of an endless chain of anti-friction rollers which, when pressed against the curtain, will move with the curtain to facilitate its vertical movements.

It is a further object to provide a form of groove which utilizes rollers on the sides of the curtain to reduce the friction under load and at the same time prevent the roller from being withdrawn from the groove.

It is another object to provide swinging doors in the rear of the curtain and doors in the hinged side sections, there being louvers above the latter doors so that when wind pressure is exerted upon the outer side of the curtain a similar pressure will be exerted on the inside of the hangar through the medium of the louvers.

These and other advantages will appear from the following description taken in connection with the drawings.

Referring to the drawings:

Figure 5 is a similar view of the left-hand side of the front of the hangar showing the lateral door or panel.

Figure 7 is a front elevation of a section of the hangar with the curtain partly broken away to show one of the posts or mullions, with another post or mullion in position behind the curtain.

Figure 8 is a vertical section across the lower edge of the curtain.

Figure 9 shows one of the lower corners of the curtain with the guiding elements attached thereto.

Figure 10 is a horizontal section through the left-hand side of the front of the hangar, showing the lateral door or panel in closed position and in open position in dotted lines.

Figure 11 is a section on the line 11—11 of Figure 6, showing the operating mechanism in top plan.

Figure 12 is a section on the line 12—12 of Figure 1.

Figure 13 is a horizontal section through the right-hand front of the hangar showing the lateral door in closed position.

Figure 14 is a transverse section of one form of mullion or post, showing the hand wheel for operating the lock bolts.

Figure 15 is a vertical section through the I-beam forming a trackway for the mullion or post and the deck of the vessel with the mullion or post supported by the I-beam and the curtain supported adjacent the post or mullion.

Figure 16 shows the lower end of one form of mullion or post and the manner in which it is supported and locked to the deck of the vessel.

Figure 17 shows the upper end of a mullion or post and the manner in which it engages the superstructure of the hangar, and the manner in which it engages an interlocking switch.

Figure 18 is a section on the line 18—18 of Figure 1, with the locking bolt omitted, showing the position of the curtain with relation to the panel or door guides.

Figure 18a shows in section one set of rollers located on one end of the bottom plate, attached to the lower end of the curtain.

Figure 19 shows a wooden ramp used on the top of the deck for guiding the mullions or posts and holding the lower edge of the curtain.

Figure 20 is a section on the line 20—20 of Figure 19.

Figure 21 shows a fragment of one of the posts or mullions with anti-friction chains in section at one side thereof.

Figure 22 is similar to Figure 21 but showing another form of anti-friction chain.

Figures 23, 24 and 25 are sections through the ramp showing various forms of locking bolt sockets.

Figure 26 is a view showing the locking wheel gear and the adjusting wheel gear to apply initial tension to the counterbalance spring.

Figure 27 is a section showing the interlock switch at the left-hand side of the entrance, looking toward the interior of the hangar.

Figure 28 is a front elevation of one side of the hangar with the curtain removed, with the vent shown in section, showing one of the mullions or posts and the mechanism for shifting the mullion or post.

Figure 29 is a section on the line 29—29 of Figure 28.

Figure 30 is a section on the line 30—30 of Figure 28.

Figure 31 is a section on the line 31—31 of Figure 28.

Figure 32 shows the drum for moving the posts or mullions, together with the support for the drum.

Figure 33 is a view of the mechanism shown in Figure 32, taken at right angles thereto.

Figure 36 is an enlarged view showing part of the mullion or post-supporting track, and a part of the upper end of the post or mullion.

Figure 37 is a longitudinal section through the track, showing the upper end of one of the posts or mullions.

Figure 38 is a section on the line 38—38 of Figure 34.

Figure 39 is a section on the line 39—39 of Figure 34.

Figure 40 is a section on the line 40—40 of Figure 6.

Figure 41 is a section on the line 41—41 of Figure 6.

Figure 42 is a top plan view of the gear box with the cover thereof removed to show the arrangement of the gears therein.

Figure 43 is a section on the line 43—43 of Figure 42.

Figure 46 is a view showing the master switch.

Figure 47 is a view taken at right angles to Figure 46.

Figure 48 is a view showing one end of the motor and the nature of the motor windings.

Figure 52 is a view showing the manner in which one end of the curtain-supporting barrel is supported, with the barrel partly in section to show counterbalancing springs.

Figures 1, 2:
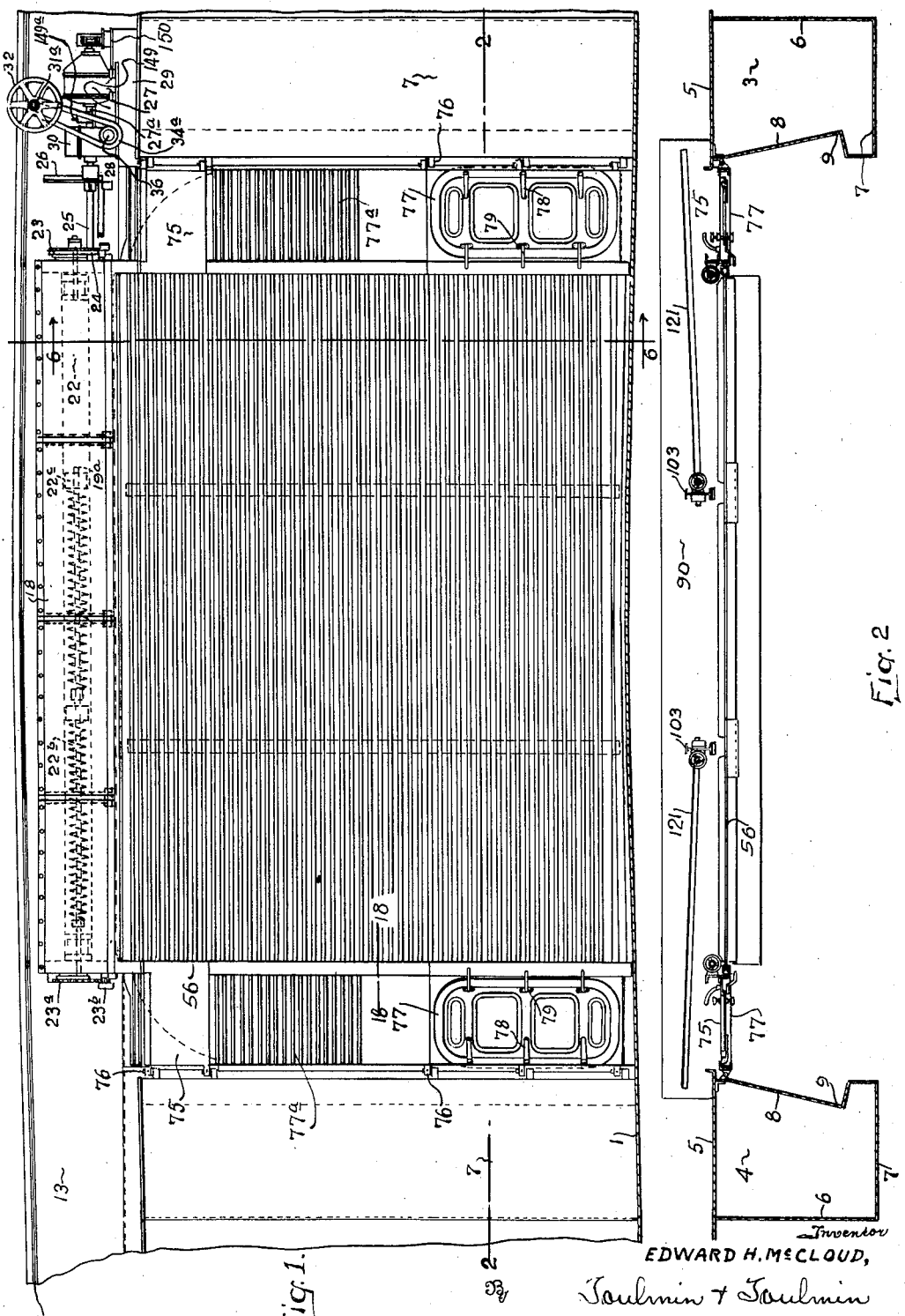
Figure 1 is a front elevation of an airplane hangar with a door attached thereto showing the lateral doors or panels, and a part of the mechanism for hoisting and lowering the door curtain.
Figure 2 is a section substantially on the line 2—2 of Figure 1.

While the curtain or closure and its operating mechanism are well adapted for use in connection with hangars generally, they are particularly adapted for use in connection with ships, the top deck of which is indicated by the numeral 1, while the top of the hangar is indicated by the numeral 2. At each side of the front of the hangar is a vent, 3 on the right-hand and 4 on the left-hand as the hangar is entered through the passageway (Figure 2).

Figure 6:
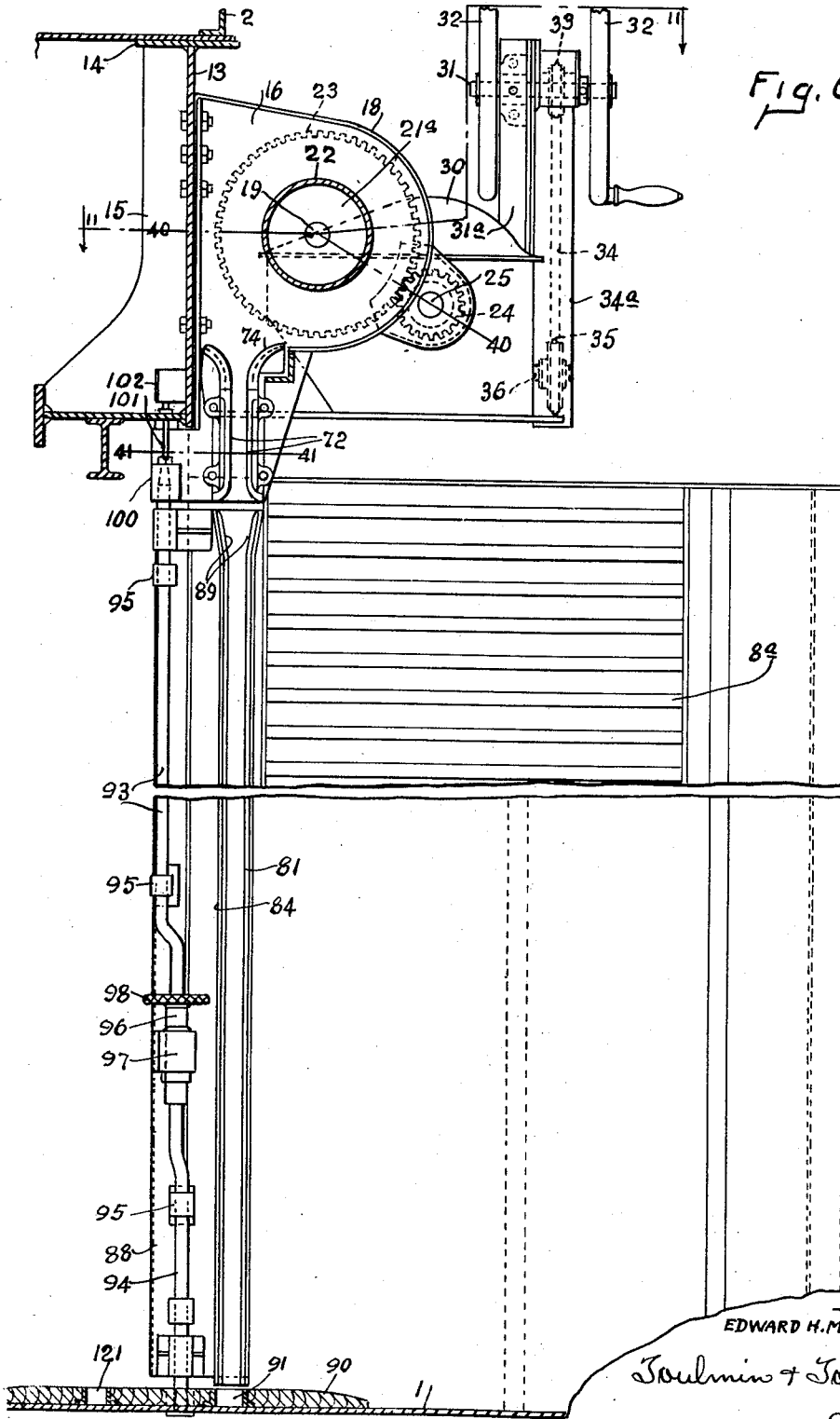
Figure 6 is a section on the line 6—6 of Figure 1, with the curtain removed.

Each vent has a rear wall 5, an outer lateral wall 6, a front wall 7 and an inner lateral wall 8. The inner lateral wall 8 has an offset 9 therein to provide a seat for the panel or lateral door when it is open. The lateral walls 8 may be provided with louvers 8a, as shown in Figure 6.

Figure 3:
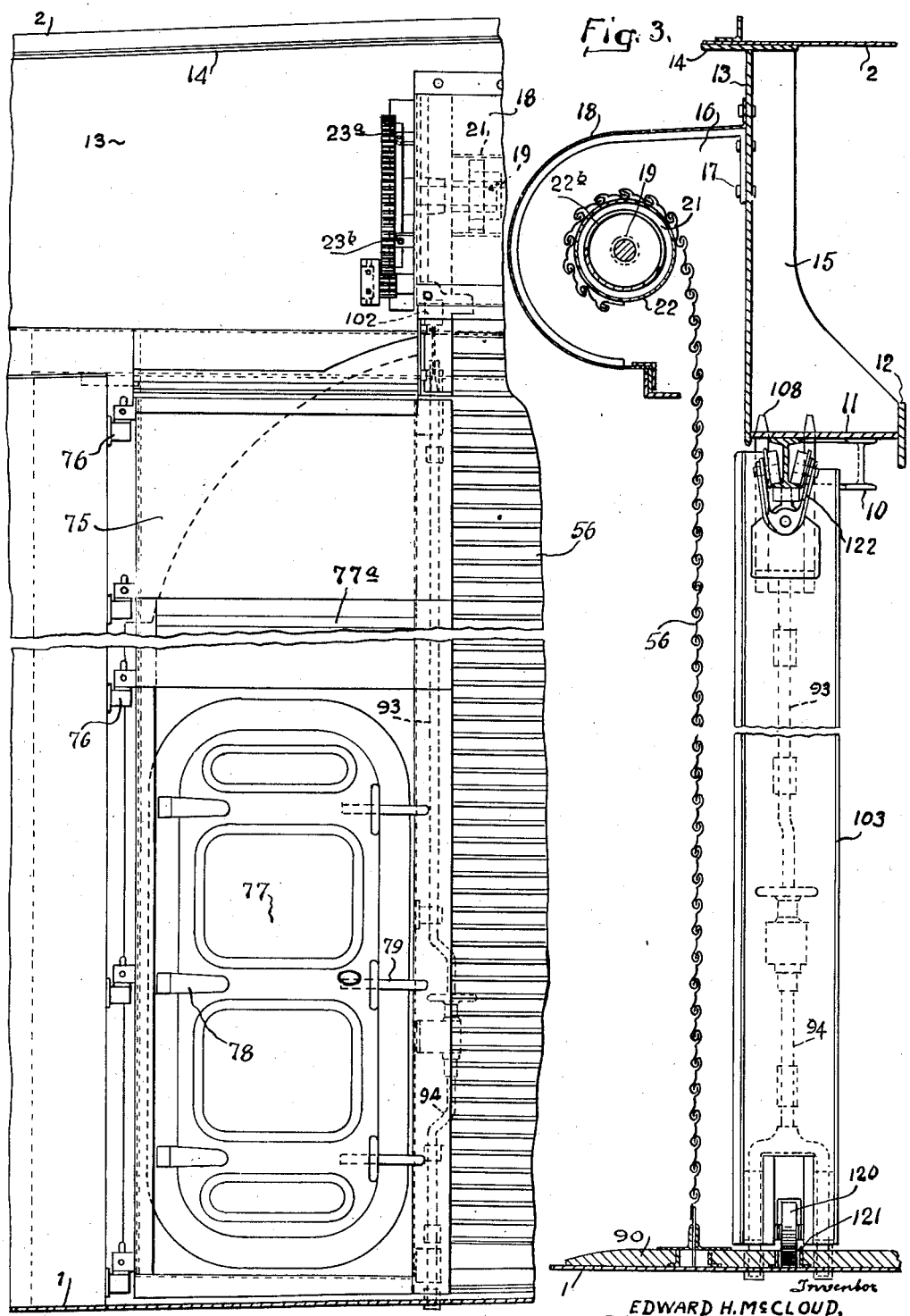
Figure 3 is a vertical section through the front of the hangar, showing the manner in which the curtain is supported and one of the posts or mullions in position to support the curtain.

Extending from one side of the hangar to the other, across the entrance thereto, is a transverse I-beam 10 which has extending from one side of the hangar to the other and supported thereby, a plate 11. On the inner edge of the plate 11 is a narrow vertical plate 12, while on the outer edge thereof and extending upwardly therefrom, is a hood support or front plate 13 (Figure 3). These elements, the I-beam 10, the plate 11, the plate 12 and the hood support or plate 13 may all be attached together in any desirable manner. In the present instance these elements are welded together.

There is also provided on top of the plate 13 a transverse plate 14 supported by the plate 13 and by brackets 15 attached to the plate 13 and to the plate 11. These various plates and I-beam form the front overhead supporting structure for the hangar. At each side of the doorway supported by the hood support or plate 13 is a bracket 16 attached to the plate by means of bolts 17. These bolts not only serve to hold the bracket 16 and the plate 13 but also support the hood 18 on the plate 13.

This hood is for the purpose of protecting and housing a barrel or drum 22, on which the curtain is supported and wound. This drum or barrel is supported at one end by means of a plug 21 having a shaft 19 journaled in ball bearings 20 (Figures 5 and 11). The other end of the barrel is supported by a shaft 19a in bearings 20a, in a plug 21a in the end of the barrel (Figure 52). On the shaft 19a is an adjusting wheel 23a, locked in adjusted position by pins 23b. The shaft 19a is rotatably supported in one of the brackets 16. On the shaft in the barrel is a pair of collars 22a, to each of which one end of a spring 22b is attached. The other end of each spring is attached to a head 23c, attached to the barrel and having in its center a hole for the shaft 19a.

Figure 4:
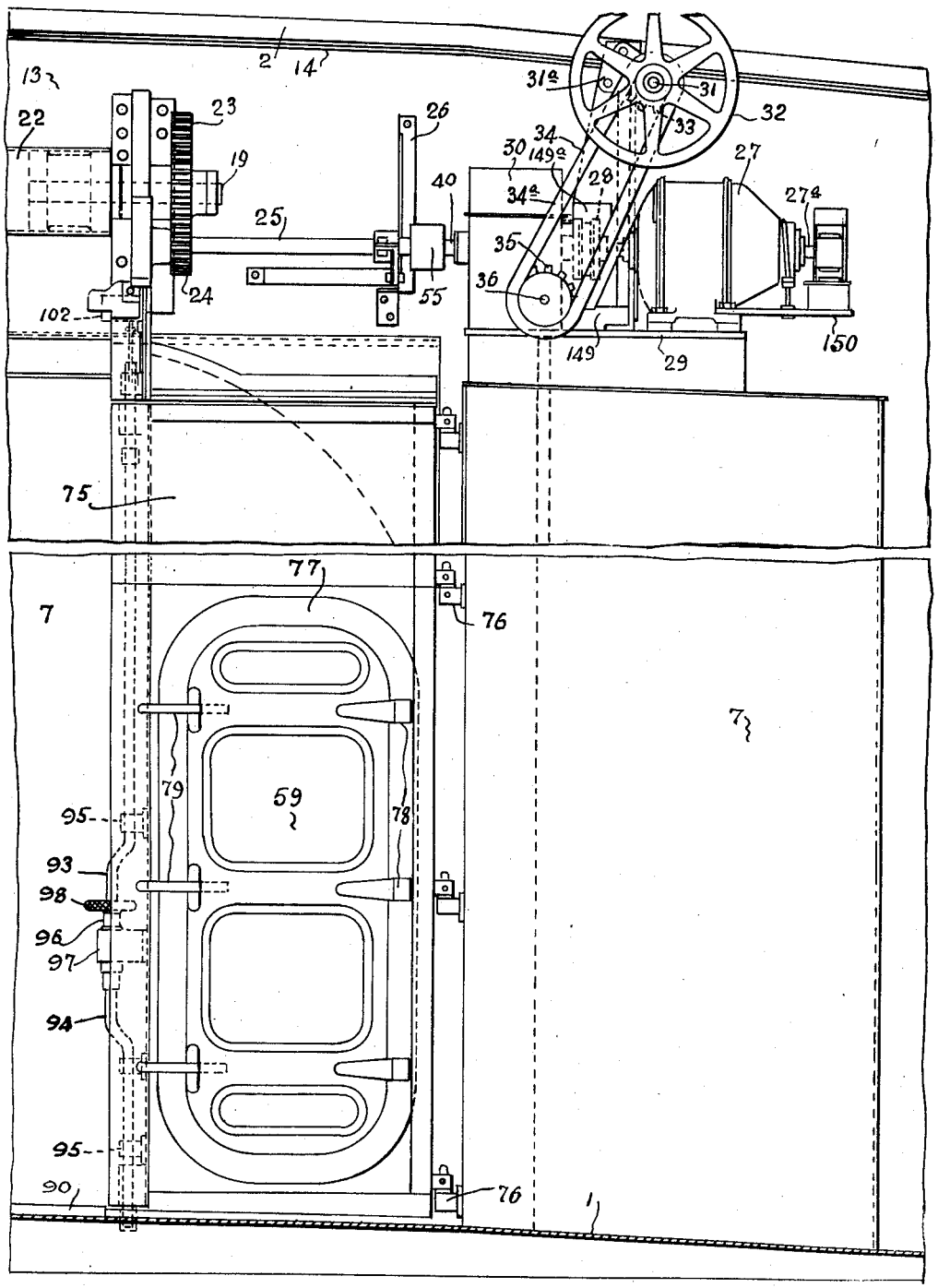
Figure 4 is an enlarged view of the right-hand side of the front of the hangar showing the operating mechanism and one of the panel or lateral doors.

The shaft 19 has on its end opposite the plug 21 a gear 23, which meshes with a pinion 24 mounted upon one end of a shaft 25 (Figure 4). This shaft 25 is supported at one end in a bearing in the bracket 16 and at its other end in a bearing in a bracket 26 suitably attached to the plate 13. A motor 27 is provided which has a motor shaft 27a connected by means of a coupling 28 to one end of a shaft 54, mounted in a gear box 30, supported on a plate 29. This plate not only serves to support the gear box but also supports the motor 27 and is suitably attached to the plate 13.

The motor through the gear box will cause the shaft 25 to rotate, and through it the drum or barrel 22. In the event that the motor does not operate the shaft 25 may be rotated through a hand mechanism located on the plate 29 adjacent the motor. This hand mechanism comprises a shaft 31 supported in suitable bearings on a bracket or support 31a, hand wheels 32 on each end of the shaft, a sprocket wheel 33 on the shaft connected by means of a sprocket chain 34 to a sprocket wheel 35 located on one end of a shaft 36 on the gear box. The sprocket wheels and the sprocket chains are protected and housed by means of a casing 34a, supported by the gear box and by the support for the shaft 31.

The shaft 36 is provided with two bearings 37 located on the inside of the gear box (Figures 42 and 43). Between these bearings the shaft 36 is provided with a worm 38 engaged by a worm gear 39 loosely mounted on a transversely disposed shaft 40 supported in suitable bearings in the sides of the gear box. Loosely mounted upon the shaft 40 and adjacent the gear 39 is a loosely mounted gear 42, connected to the worm gear by means of a clutch 41. The shaft 40 may be connected directly to the shaft 25 by means of a flexible connection 55.

Meshing with the gear 42 is a pinion 43 affixed to one end of a shaft 44, which extends through and rotates in a sleeve 45 supported adjacent the periphery of a gear 46 rotatably mounted on the shaft 40, adjacent the gear 42. On the other end of the shaft 44 and opposite the gear 46 from the shaft 44 is affixed a pinion 47. The pinions 43 and 47 are not of the same size. Also in mesh with the gear 42 is a pinion 48 affixed to one end of a shaft 49 rotatably mounted in a sleeve 50 adjacent the periphery of the gear 46 and diametrically opposite the sleeve 45.

Affixed to the other end of the shaft 49 and on the side of the gear 46 opposite the pinion 48 is a pinion 51. This pinion is different in size from the pinion 48. Affixed to the shaft 40 for rotation therewith is a gear 52 which meshes with the pinions 47 and 51. Meshing with the gear 46 is a pinion 53 affixed to the shaft 54, supported transversely of the box in suitable bearings therefor. The shaft 40 is connected to the shaft 25 by a coupling 55, as shown in Figure 11.

The curtain or closure 56 for the entrance into the hangar, supported and rolled upon the drum or barrel 22 (Figure 3), is composed of a plurality of galvanized steel slats 57 (Figure 8), each of which has its upper edge 58 curled to engage a correspondingly curled lower edge 59 of an adjacent slat. These interlocking slats form the bulk of the closure or curtain. At the lower edge of the curtain there is a bottom plate 60, suitably attached to the lower slat of the curtain by means of a narrow slat having an upper curled edge to engage the lower curtain slat, in the same manner that two adjacent slats are attached to each other.

At the lower edge of this bottom plate there are one or more angle bars 61 adapted to engage the deck of the ship directly or through intervening weather strips 62. The bottom plate may extend below the angle bar or bars 61 and fit in a groove provided therefor in a ramp, or the angle bars may lie flat upon the deck, as shown in Figure 17 (Figure 15). In all there are shown three connections between the bottom of the curtain and the deck or ramp attached to the deck. In one (Figure 15) the angle bars fit upon the surface of the deck or ramp. In the other (Figure 8) the angle bar is provided with weather strips to engage the deck or ramp, and in the third (Figure 3) the bottom plate will project into a slot provided in the ramp.

There is also provided on the bottom plate one or more foot pieces 63 attached to the plate in any suitable manner (Figure 8). At each end of the bottom plate one or more shafts 64 are attached. These shafts extend through holes provided therefor in the ends of the plate and are welded thereto, as indicated by the numeral 65 (Figure 18a). On each end of each shaft is a roller 66 made of bronze or other suitable material. These rollers are adapted to engage the bottoms of grooves to prevent friction between the edges of the curtain and the guide or support therefor.

Each slat is arcuate and has at each end, in the concave part thereof, a closure plate 67 (Figure 9). This plate serves to fill the space caused by the arcuate shape of the slat, and serves to form a more complete closure around the lateral edges of the curtain. Certain closure plates are provided with lockends 68, which engage the ends of adjacent slats to prevent relative longitudinal movement of the slats with relation to one another. Certain of the closure plates have inwardly directed extensions 69 which serve to form a more extensive connection between the closure plate and the slat. These closure plates with extensions thereon are provided with a shaft 70, one for each closure plate. On each shaft is a roller 71 adapted to engage the lateral edges of grooves for guiding the curtain as it moves up and down for closing and opening the passageway into the hangar.

The grooves in which the rollers 66 and 71 fit are made up of various elements. There is one complete groove on each side of the door. The upper part of each groove is formed by a pair of guides 72, spaced from one another to provide a passageway for the rollers and the supports for the rollers. These guides 72, as is clear from Figure 6, are supported on the bracket 16, and have their upper and lower ends flared, as indicated by the numeral 73, to provide ready and adequate entrance for the rollers and their supports into this part of the door guide. The guides 72 are provided on the interior thereof, adjacent the bracket 16, with an enlarged part 74 for receiving the rollers 71.

On each side of the entrance to the hangar and to the rear of each vent (Figure 5), is a panel 75 hinged at one edge to the vent structure by means of hinges 76. In each panel or lateral door is a small door 77, above which there is a plurality of louvers 77a. The small door in each panel is supported on the panel by means of hinges 78 and is latched in closed position by means of latches 79. The free edge of each panel or lateral door has provided therein a channelway constituting a part of the guide for one edge of the curtain or closure. When the panels or lateral doors serve to partly close the entrance into the hangar these channels in the lateral doors are in alignment with the channels formed by the guides 72.

The nature of the free edge of each lateral door or panel is shown in Figure 18. Attached to one side of the panel is an angle iron 80, which has attached thereto an angle iron 81 and a plate 82 by means of rivets 83. To the plate 82 is attached an angle iron 84 by means of bolts 85. The angle irons 84 and 81 form a channel in which one edge of the curtain or closure is positioned and travels. Between the parts of the angle irons 81 and 84 that form the guide channel are spaced strips 86, one attached to each of the angle irons 81 and 84. These strips are along the edges of the angle irons and are adapted to engage that part of the curtain to which the closure plates are attached.

In the bottom of the channel formed by these two angle irons and attached to the parts of the angle irons forming the channel are fabric webbings 87 adapted to be engaged by the rollers 71. These rollers, in cooperation with the channel structure, help to maintain the door in proper position and to prevent its sagging against the action of wind thereon. The curtain, in cooperation with the strips 86, serves to prevent air passing around the edges of the curtain into the hangar. There is also attached to the plate 82 an angle iron 88.

The upper ends of the parts of the angle irons 81 and 84 that form the guides for the curtain are flared (Figure 6), as indicated by the numeral 89, for the purpose of guiding the curtains and the rollers thereon as they enter into the channelway formed by the angle irons 81 and 84. These flared ends of the agle irons serve to receive the roller structures as they leave the guide members 72. The deck of the vessel just beneath the curtain may be provided with a ramp 90, which has a groove 91 therein for receiving the lower edge of the curtain, or some part thereof. This groove 91 is provided on each edge with a wear strip 92 so that the fit between the ramp and the curtain may not become loosened by wear.

To the plate 82 or to the angle iron 88 is attached a locking element for locking a panel in position to partly close the entrance into the hangar. This locking element consists of an upper locking bolt 93, a lower locking bolt 94, a sleeve 96 in threaded connection with both of the locking bolts so that by rotation of the sleeve the bolts may be moved longitudinally. These bolts are supported on the edge of the panel or lateral door by means of guide clips 95, and the sleeve is supported by means of a support 97, which permits the free rotation of the sleeve through a hand wheel 98, suitably attached to the sleeve.

The lower locking bolt engages within sockets 99 in the ramp 90, while the upper locking bolt engages in a socket 100, suitably attached to some part of the overhead structure, such as the plate 13. This upper locking bolt is adapted to engage a push rod 101 forming part of an interlocking switch 102 supported immediately above the upper end of the upper locking bolt.

By means of this interlocking switch whenever the lateral door or panel is not in closed position the circuit to the motor is broken so that the curtain cannot be either raised or lowered. Whenever the lateral door or panel is closed and the locking bolts are moved to locking positions, the interlocking switch is operated to form a complete circuit from the source of power to the motor so that if all of the interlocking switches are operated by their cooperating structures the circuit to the motor is complete so that the curtain may be raised or lowered. There is one of these interlocking switches at each free edge of the panel or lateral door when it is in closed position.

Figure 34:
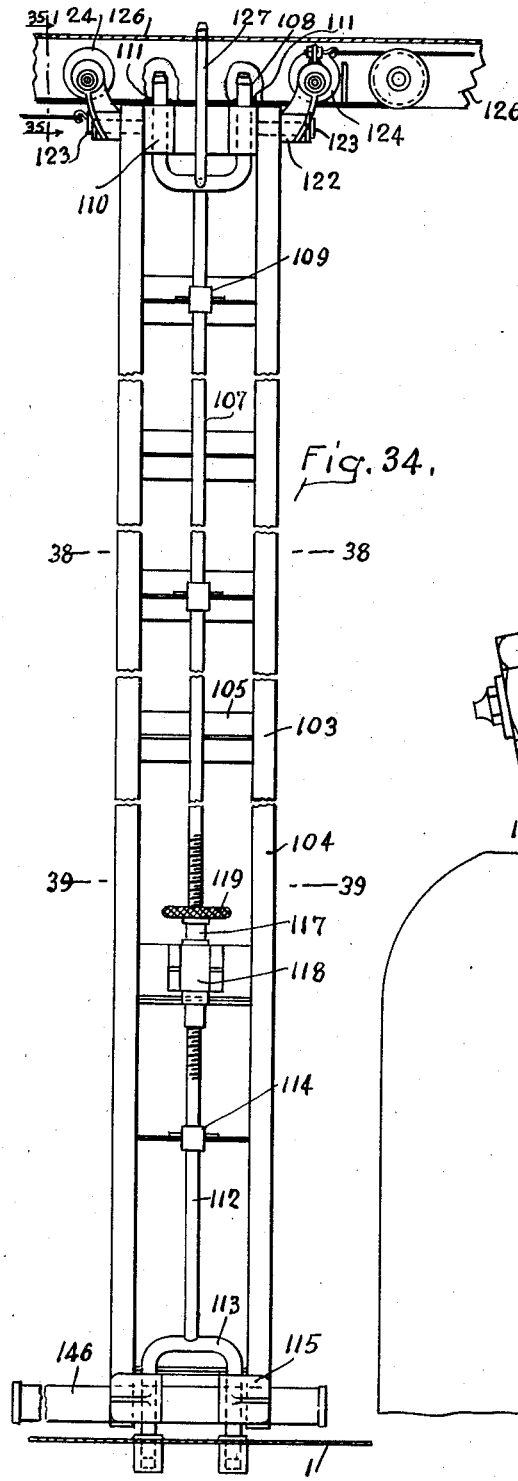
Figure 34 shows one form of mullion or curtain support, and the part of the hangar to which it is attached.
Figure 35:
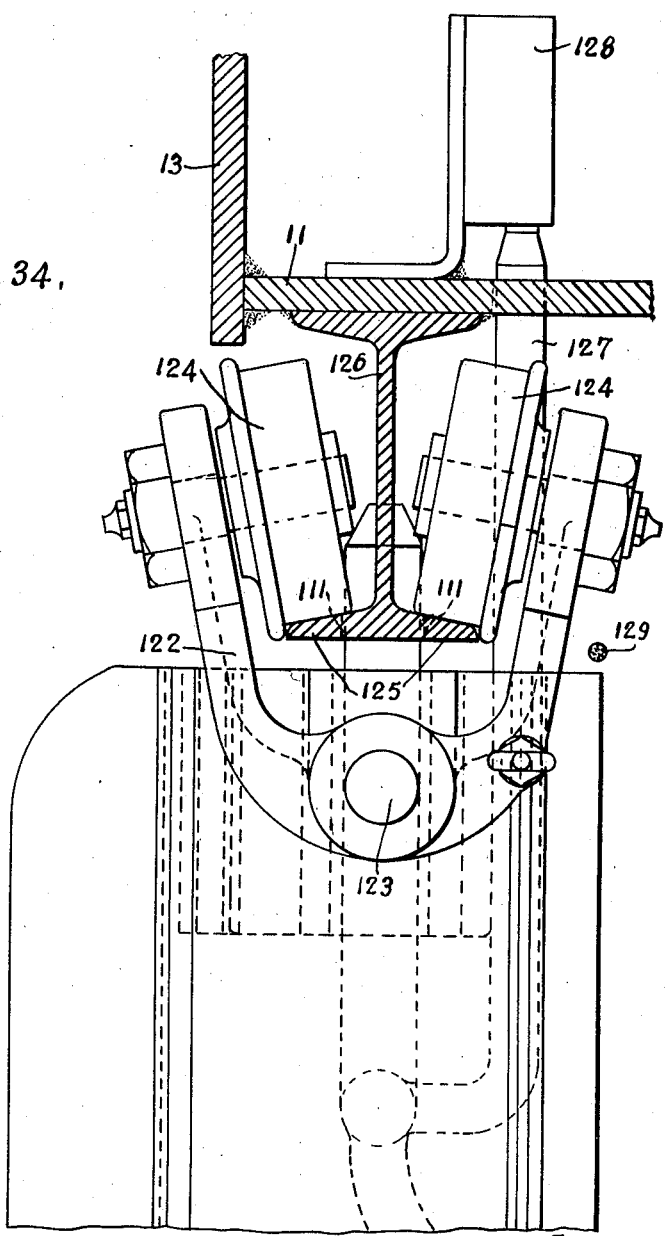
Figure 35 is a section on the line 35—35 of Figure 34.

In order to aid in supporting the curtain there is provided one or more posts or braces 103 (Figure 34). These posts or braces may be composed of a single I-beam or they may be composed of channel irons 104 suitably connected by means of plates 105. The posts may be provided with hard wood strips 106 so that the friction between the curtain and the post may be reduced, and in order to further reduce the friction between the curtain and the posts 103 the hard wood strips may be treated with paraffin. Each post is provided with an upper locking bolt 107, which has one or more prongs thereon 108, adapted to engage some socket in the superstructure for locking the upper end of the post or mullion.

These upper locking bolts are guided by means of clips 109, suitably attached to the channel irons or to the plates connecting the two channel irons. The prongs 108 are guided and supported by means of clips 110. These prongs 108 may project into holes 111 provided either in the plate 11 or in the lower flanges of an I-beam serving as a track for supporting the posts 103.

Each post 103 is provided with a lower locking bolt 112, which has on its lower end one or more prongs 113. This bolt is supported by and guided on the post by means of clips 114, while the prongs are guided by means of clips 115. These prongs are adapted to engage in sockets 116 formed in the deck of the ship or in the ramp 90. The nature of these sockets is fully shown in Figures 23, 24 and 25, and the socket is usually lined with some cup-shaped piece of metal.

The two locking bolts are connected by means of a sleeve 117 threaded onto the adjacent ends of the two bolts so that by rotating the sleeve the bolts may move to or away from each other. The sleeve is supported by means of a support 118 and is provided with a hand wheel 119, by which it may be rotated in its support for moving the locking bolts. The lower end of the post 103 may be provided with a roller 120 adapted to travel along a groove 121 formed in the ramp.

It will be noticed that this groove is located at an angle to the groove in which the lower edge of the curtain fits when closed. The overhead support for the post is arranged in the same manner so that as the post is removed from the doorway it is moved to a position slightly toward the interior of the hangar and away from any part of the front of the hangar, such as the lateral doors or panels.

The upper end of each post or brace 103 is provided with one or more yokes 122. In the brace formed of two channel irons there is a yoke attached to each channel iron by means of bolts 123. The free end of each yoke supports a roller 124 so that there is a pair of rollers on the upper end of the post for each channel iron. These rollers engage the lower flanges 125 of an I-beam 126 positioned transversely of the passageway into the hangar and just beneath the plate 11.

The upper locking bolt 107 is provided with a push rod 127 adapted to engage an interlocking switch 128 for closing an electric circuit in which the operating motor is included. For the purpose of moving the posts 103 to and from their curtain-supporting positions (Figure 28), two cables are provided, one cable 129 attached at the point 130 to some suitable part of the upper end of the brace 103. This cable passes over a pulley 131 and down to a drum 132, to which its other end is attached in any suitable manner. One end of the other cable 133 is attached at the point 134 to some suitable part of the upper post and passes, first, over a pulley 135 and then over the pulley 131, down to the drum to which its other end is attached.

These cables are so attached to the drum that when the drum rotates one cable is taken up and the other one let off, and the cables are so supported with relation to the posts 103 that the rotation of the drum will cause the posts or mullions to move along the track formed by the I-beam (Figures 32 and 33). The drum is mounted upon a shaft 136, supported in bearings suitably provided in brackets 137 located on the top of a support formed of two uprights 138. On one end of the drum shaft is a worm gear 139 engaged by a worm 140 supported on the brackets 141, attached to the brackets 137. The worm shaft is provided with an operating crank 142.

Instead of having the ramp and the grooves for guiding the lower ends of the posts one or more cables may be provided. As shown in Figure 30 there are two of these cables, one at each side of the entrance to the hangar. These cables are designated by the numeral 143, and each has one end attached to an anchor 144. The other ends of these cables are connected by means of a turnbuckle 145.

In order that the posts 103 may be guided by the cables, each post is provided at its lower end with a guide sleeve 146 through which the cable extends. Instead of relying upon the paraffin strips the posts 103 may be provided with roller-supported chains 147, which have rollers 148 (Figure 15). These chains project out beyond the surfaces of the posts 103 and are adapted to be engaged by the curtain as it is raised and lowered. When the curtain engages these chains it tends to move the chains along their seats. The relation between the posts 103, these chain guides and the curtain is shown in Figure 15.

Figure 44:
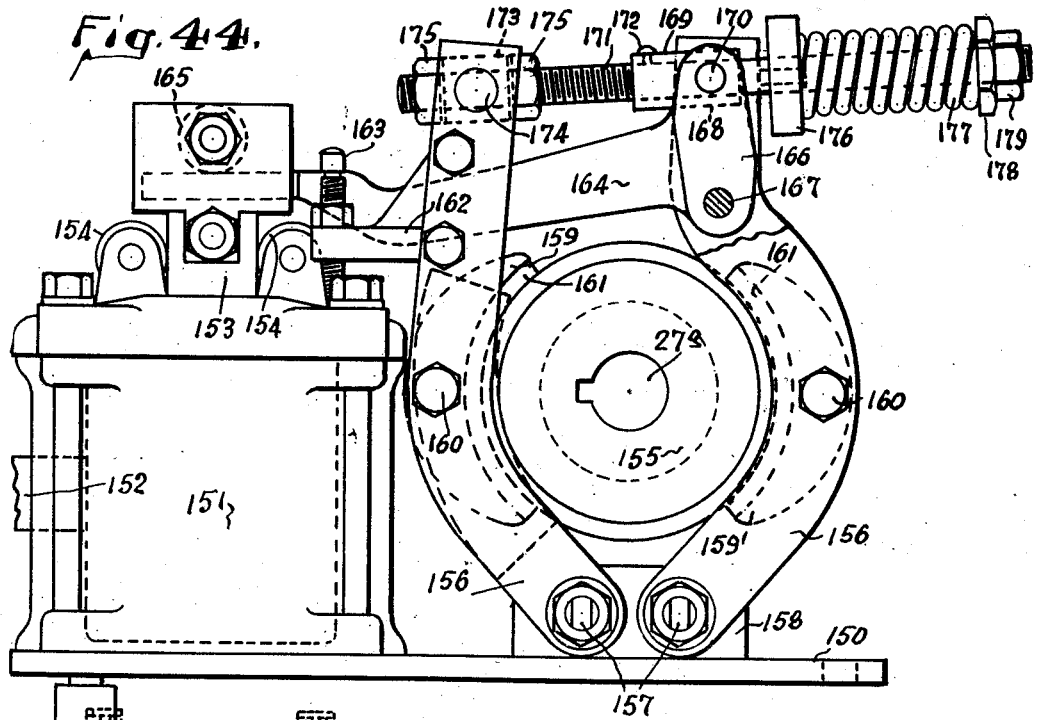
Figure 44 is a side elevation of the magnetic brake mechanism attached to one end of the motor shaft.

Supported on brackets 149, at one side of the gear box (Figures 1 and 4), is a limiting switch 149a, the purpose of which is to break the motor cricuit when the curtain has reached either its upper limit or its lower limit of movement. Adjacent the motor and on the plate 29 is a plate 150, which supports a braking mechanism (Figure 44). On this plate 150 is a solenoid 151, which has two conductor casings 152 through which an electric conductor extends. In this casing is a core 153 guided at its upper end by means of rollers 154 suitably supported on the upper surface of the casing.

Figure 45:
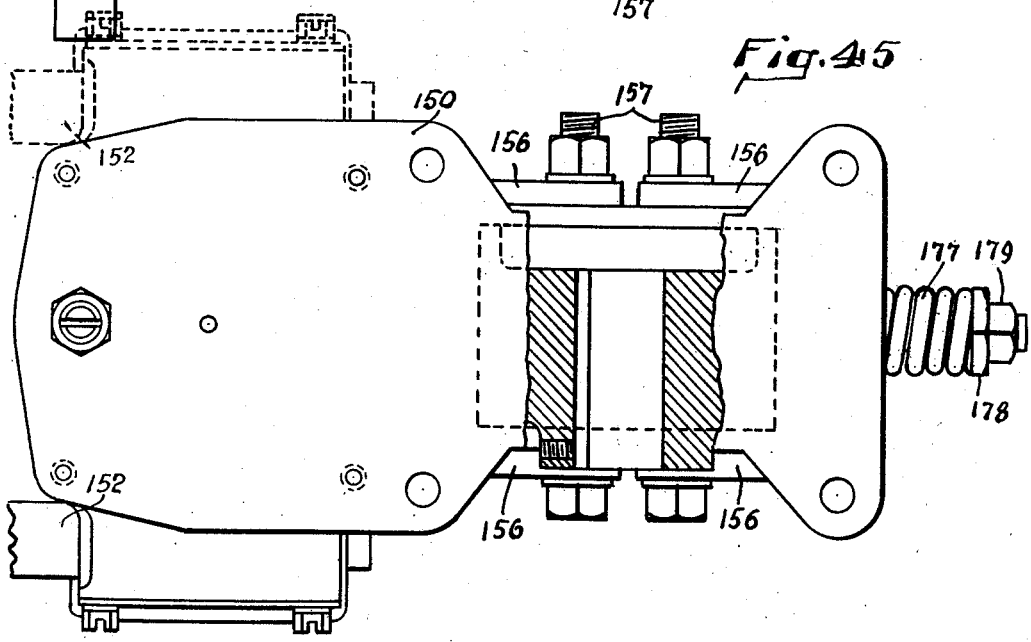
Figure 45 is a bottom plan view of the brake mechanism.

On the motor shaft 27a is a drum 155 adapted to be engaged by two clutch elements located on opposite sides of the drum. For supporting these clutch elements there is provided a pair of arms 156, each pivoted at its lower end to a lug 158 at the point 157 (Figure 45). This lug is attached to the upper surface of the plate 150 and is located at one side of the solenoid. Brake shoes 159 are attached intermediate their ends to the arms at the points 160. The arms are arranged in pairs, one pair for each shoe, so that each shoe is pivoted to swing between a pair of arms.

Each brake shoe has a shoe lining 161 attached to the shoe in any suitable manner. To one pair of the arms 156 is attached a stop 162, which has threaded therein an adjusting screw 163 which engages some suitable button located on top of the solenoid. The stop and set screw are for the purpose of limiting the movement of the arms to which they are attached from the brake drum. To the other pair of these arms, above the brake drum, is attached a lever 164. The free end of this lever engages beneath a roller 165 located on top of the solenoid core 153.

The lever is pivoted to the arms 156 by means of a pivot pin 167, which is located at one end of a cross member 166 formed integral with one end of the lever. The other end of the cross member 166 is bifurcated at 168 to receive a block 169, to which it is pivoted by means of pins 170. The block 169 has a hole therethrough to receive a screw shaft 171, to which the block is affixed by means of a rivet or other locking member 172. On the threaded end of the screw shaft 171 is a block 173, pivoted between the arms 156, to which the stop 162 is attached by means of pivot pins 174.

Threaded on the screw shaft 171, at opposite ends of the block 173, are two locknuts 175 which serve to adjust the block 173 longitudinally of the screw shaft. Slidably mounted on the screw shaft 171, adjacent the arms 156 to which the lever 164 is attached, is a spring seat 176, which serves to seat one end of a spring 177 coiled around the screw shaft 171. The other end of this spring 177 is seated against a seat member 178, which is engaged by a nut 179 threaded on the end of the screw shaft for the purpose of regulating the tension of the spring.

The block 173 is adjusted so that the brake shoes will engage the drum under the action of the spring 177, and hold the motor shaft against rotation. When the solenoid is energized the free end of the lever 164 is caused to move downward, thereby forcing the pair of brake arms apart so that the drum is released and the motor shaft can rotate.

Figure 49:
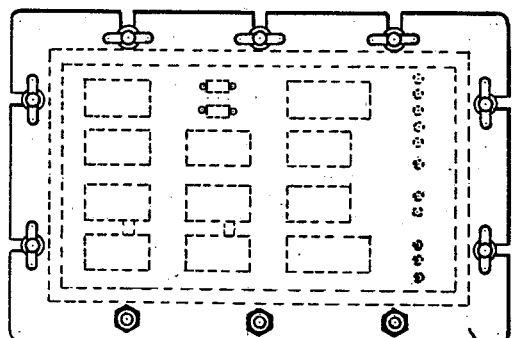
Figure 49 shows a view of a control panel.
Figure 50:
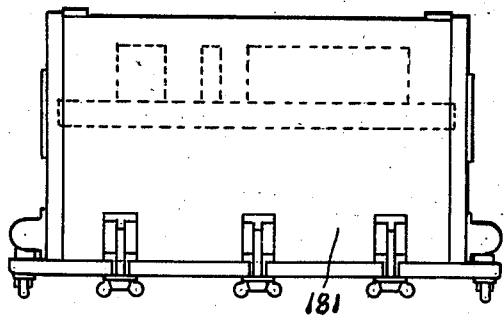
Figure 50 is a view taken at right angles to Figure 49.

In Figures 46 and 47 two views of the master switch 180 are shown. This switch may be located in any suitable position for access. There is shown in Figures 49 and 50 two views of a control panel 181. There are two of these control panels, one located at each side of the entrance from which the motor may be operated for rolling and unrolling the curtain.

In Figure 48, which shows one end of the motor, the motor is shown as having a stabilizing field 182, a shunt field 183 and a commutating field 184. The purpose of this figure is to illustrate the form of motor, well adapted for use in connection with the present door structure.

Figure 51:
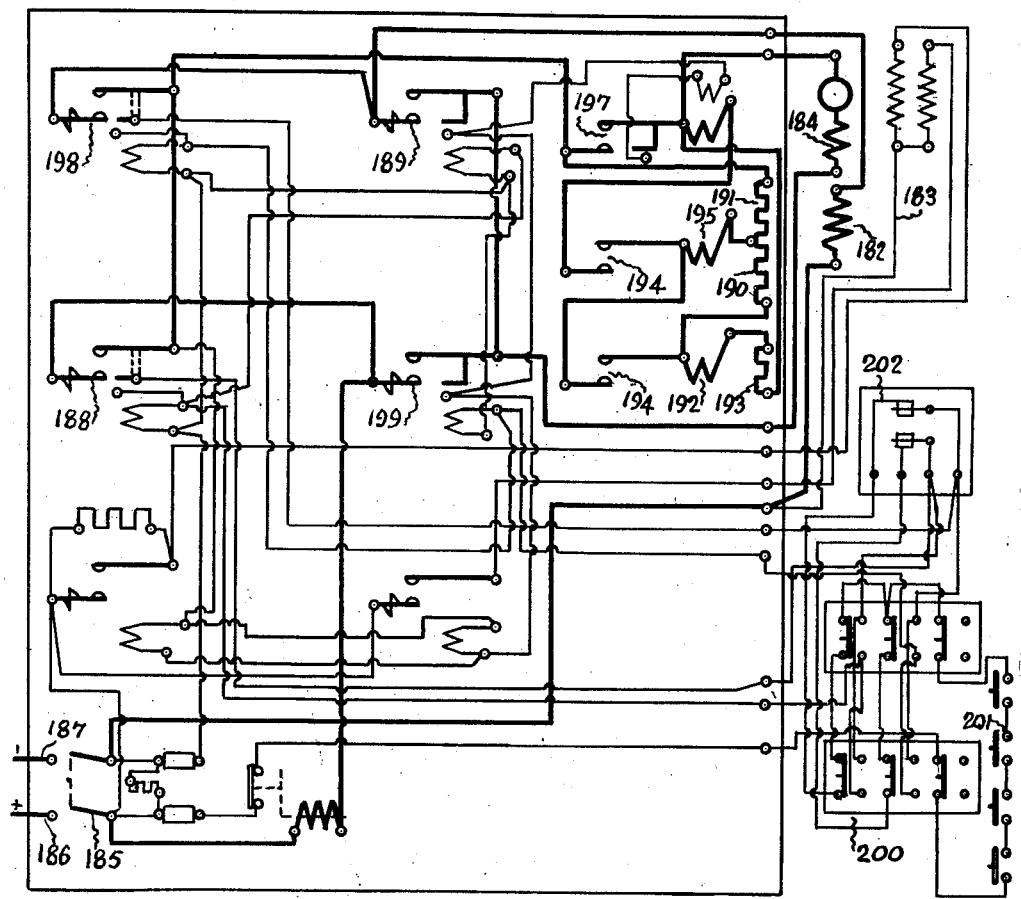
Figure 51 is a diagrammatic view showing the electrical circuits for operating the motor and the curtain.

In Figure 51 there is shown diagrammatically the electrical wiring for the motor, in which there is a line switch 185. With the line switch closed and the voltage applied at 186 and 187, pressing the "open" button of the push button station energizes the open contactors, if the open limit switch contacts are closed. The open contactors 188 and 189 then close, applying voltage to the motor through the starting resistors 190—191 and 192—193.

The first current inrush locks the contactor 194 open until the current drops to the value for which the contactor is set. Contactor 194 then closes, shorting out section 190—190a of the resistor, and at the same time causing the current to flow through the series coil of contactor 197. Contactor 197 closes in a manner similar to contactor 196, and on closing applies full voltage to the motor.

Contactor 197 is held closed by the shunt holding coil. After starting the motor will continue to run until the open limit switch contacts open, or until the stop button of the push button station is pressed. The opening of the open limit switch contacts, or the pressing of the stop button of the push button station energizes the coils of the open contactors. These contactors then drop out, removing voltage from the motor.

The operation of the control in the closed direction is identical with that in the open direction except that the closed contactors 198 and 199 close the limit switch contactors and the closed push button contactors function instead of the open contactors 188 and 189, open the limit switch contactors and open the push button contactors. If the motor is stopped by the opening of either limit switch contact, the motor can be started only in the opposite direction.

Two push button control stations are provided for electrical operation of the curtain from both sides of the hangar space. The electric motor will drive the barrel through reduction gearing, thereby coiling or uncoiling the curtain, as desired. This would be accomplished as follows: By pushing the "open" or the "close" button at either of the operating stations, causing the magnetic starter to cut in the main line current to the motor. The motor will then operate the curtain. The limit switches will, at the termination of the curtain travel for opening or closing the door, break the control current through the magnetic starter, which will interrupt the motor circuit and simultaneously the magnetic brake will close. The curtain can be stopped at an intermediate point when traveling in either direction by pushing the stop button at an operating station. From the intermediate point of stopping it can then be operated either up or down, as desired.

In Figure 51 the push buttons are indicated by the numeral 200, the interlocking switch by the numeral 201, and the limit switch by the numeral 202. This limit switch, as shown in this figure, is a diagrammatic representation of the limit switch 149a, shown in connection with the other magnetic structure. The interlocking switches are operated by the locking means used in connection with the lateral doors or panels, and in connection with the posts or braces 103. The motor will not operate unless each of the interlocking switches is closed so that the circuit is complete.

It will be understood that I desire to comprehend within my invention such modifications as come within the scope of my claims and my invention.

Having thus fully described my invention, what I claim as new and desire to secure by Letters Patent, is:

1. In combination with an airplane hangar having an entrance passageway, a closure for the passageway comprising laterally disposed swinging doors, a suspended curtain member, and means on the swinging doors to guide the curtain member.

2. In combination with an airplane hangar having an entrance passageway, a closure for the passageway comprising laterally disposed swinging doors, a suspended curtain member, and means on the doors to guide the curtain member, said means consisting of a groove on the free edge of each door.

3. In combination with an airplane hangar having an entrance passageway, a closure for the passageway comprising laterally disposed horizontally swinging doors spaced apart from one another, a suspended curtain member, and means on the doors to guide the curtain member, said means consisting of a channel member on the free edge of each door member.

4. In combination with an airplane hangar having an entrance passageway, a closure for the passageway comprising laterally disposed horizontally swinging doors spaced apart from one another, a suspended curtain member, and means integral with the free edge of each door to receive the edge of the curtain, whereby the curtain member is guided as it moves up and down.

5. In combination with an airplane hangar having an entrance passageway, a closure for the passageway comprising laterally disposed spaced swinging doors, a suspended curtain member in said space, and means on the doors to guide the curtain member as it moves up and down, said means consisting of a channel member on the free edge of each door member.

6. In combination with an airplane hangar having an entrance passageway, a closure for the passageway comprising laterally disposed swinging doors, a suspended curtain member, each of said doors having a plurality of independently swinging panels, and means on each door panel to guide the curtain member as it moves up and down.

7. In combination with an airplane hangar having an entrance passageway, a closure for the passageway comprising laterally disposed swinging doors, a suspended curtain member, each of said doors having a plurality of panels swingable independently of one another on a common axis, and means on each door panel to guide the curtain member as it moves up and down.

8. In combination with an airplane hangar having an entrance passageway, a closure for the passageway comprising laterally disposed spaced swinging doors, a suspended curtain member in said space, each of said doors having a plurality of independently swinging panels, and a groove on the free edge of each door panel forming an aligned continuous groove in the closed position of said door to guide the curtain member as it moves up and down.

9. In combination with an airplane hangar having an entrance passageway, a trackway above the passageway, a closure for the passageway comprising laterally disposed movable door members, a vertically movable curtain member, means on the door members to guide the curtain member, and means movable along the trackway to brace the curtain member.

10. In combination with an airplane hangar having an entrance passageway, a trackway above the passageway, a closure for the passageway comprising laterally disposed movable door members, a vertically movable curtain member, means on the door members to guide the curtain member, and means movable along the trackway to brace the curtain member, said last-named means consisting of a post having rollers in engagement with the trackway and means to lock the post against movement.

11. In combination with an airplane hangar having an entrance passageway, a trackway above the passageway, a closure for the passageway comprising laterally disposed movable door members, a vertically movable curtain member, means on the door members to guide the curtain member, a post having rollers thereon engaging the trackway to brace the curtain member, means to move the post along the trackway, and means to lock the post against movement along the trackway.

12. In combination with an airplane hangar having an entrance passageway, a track above the passageway, a closure for the passageway comprising laterally disposed movable door members, a vertically movable curtain member, means on the door members to guide the curtain member, a post having rollers thereon engaging the track to brace the curtain member, means to move the post along the track, and means to lock the post against movement along the track, said first-named means comprising a drum, pulleys and a pair of cables, each cable attached at one end to the drum and at its other end to the post.

13. In combination with an airplane hangar having an entrance passageway, a track above the passageway, a closure for the passageway comprising laterally disposed movable door members, a vertically movable curtain member, a post having rollers thereon engaging the track to brace the curtain member, means to move the post along the track, means to lock the post against movement along the track, said first-named means comprising a drum, a single pulley, a pair of pulleys and a pair of cables, each cable attached at one end to the drum and at its other end to the post, one cable passing over one of the pair of pulleys and the other cable passing over the single pulley and the other of the pair of pulleys.

14. In combination with an airplane hangar having an entrance passageway, a closure for the passageway comprising movable lateral door members and a vertically movable curtain member, means on the door members to guide the curtain member when the door members are in closed position, a motor and a motor circuit connected into a source of electrical energy for moving the curtain member, a plurality of normally open switches in said circuit, a brace for the curtain, means to lock the brace to brace the curtain and the door members in closed positions, and means operated by said first-named means to close all of said switches.

15. In combination with an airplane hangar having an entrance passageway, a closure for the passageway comprising movable lateral door members and a vertically movable curtain member, means on the door members to guide the curtain member when the door members are in closed position, a motor and a motor circuit connected into a source of electrical energy for moving the curtain member, a plurality of normally open switches in said circuit, a brace for the curtain, means to lock the brace to brace the curtain and the door members in closed positions, and means operated by said first-named means to close all of said switches, said first-named means comprising a lock bolt for each door member and for the brace.

16. In combination with an airplane hangar having an entrance passageway, a traveling closure for the passageway, guiding means for the closure, a brace for the closure, said brace being positioned out of the plane of the closure, and means on the brace adapted to be engaged by the closure.

17. In combination with an airplane hangar having an entrance passageway, a traveling closure for the passageway, guiding means for the closure, a brace for the closure, said brace being substantially parallel to the closure but out of the plane thereof, and means on the brace adapted to be engaged by the closure.

18. In combination with an airplane hangar having an entrance passageway, a traveling closure for the passageway, a brace for the closure, said brace being substantially parallel to the closure, and anti-friction means on the brace adapted to be engaged by the closure, said means consisting of a continuous roller-supported chain adapted to engage the closure.

19. In combination with an airplane hangar having an entrance passageway, a traveling closure for the passageway, guides to guide the closure, a removable brace for the closure, said brace being positioned out of the plane of the closure, and means on the brace adapted to engage the closure at a location intermediate the edges thereof.

20. In combination with an airplane hangar having an entrance passageway, a traveling closure for the passageway, guides to guide the closure, a removable brace for the closure, said brace being positioned behind the closure and engaging the rear surface thereof, and anti-friction means on the brace adapted to be engaged by the closure.

21. In combination with an airplane hangar having an entrance passageway, a traveling closure for the passageway, rollers on the closure, guides to engage the rollers to guide the closure, a removable brace for the closure, said brace being substantially parallel to the closure, and anti-friction means on the brace adapted to be engaged by the closure, said means consisting of a continuous roller-supported chain adapted to engage the closure.

22. In combination with an airplane hangar having an entrance passageway, a track above the passageway, a traveling closure for the passageway, guides to guide the closure, a vertically disposed brace for the closure supported on the track said brace being positioned out of the plane of the closure, and anti-friction means on the brace adapted to be engaged by the closure.

23. In combination with an airplane hangar having an entrance passageway, a track above the passageway, a traveling closure for the passageway, rollers on the closure, guides to engage the rollers to guide the closure, a vertically disposed brace for the closure supported on the track, and anti-friction means on the brace adapted to be engaged by the closure, said means consisting of a continuous roller-supported chain.

24. In combination with an airplane hangar having an entrance passageway, a track over the passageway, a closure for the passageway, guiding means for the closure, a movable post for bracing the closure positioned out of the plane of said closure, said post having on its upper end rollers to engage the track to support and guide the post, a guide for the lower end of the post, said guide being substantially in a plane passing through the track, and means engaging the post adjacent the rollers to move the post along the track.

25. In combination with an airplane hangar having an entrance passageway, a track over the passageway, a closure for the passageway, guiding means for the closure, a movable post for bracing the closure positioned out of the plane of said closure, said post having on its upper end rollers to engage the track to support and guide the post, a guide for the lower end of the post, said guide being substantially in a plane passing through the track, and means engaging the post adjacent the rollers to move the post along the track, said guide consisting of a groove in the hangar floor and a roller on the post fitting in the groove.

26. In combination with an airplane hangar having an entrance passageway, a closure for the passageway comprising spaced lateral doors and a curtain in the space therebetween, means to raise and lower the curtain, means to lock the lateral doors in closed positions, and means operated by the door-locking means to prevent the operation of the curtain-raising means.

27. In combination with an airplane hangar having an entrance passageway, a closure for the passageway comprising spaced lateral doors and a curtain in the space therebetween, a motor including an electric circuit to raise and lower the curtain, means to lock the lateral doors in closed positions, and switches in the curtain-raising electric circuit operated by the door-locking means to break the circuit when the lateral doors are closed.

28. In combination with an airplane hangar having an entrance passageway, a closure for the passageway comprising spaced lateral doors and a curtain in the space therebetween, a motor including an electric circuit to raise and lower the curtain, means to lock the lateral doors in closed positions, switches in the curtain-raising electric circuit operated by the door-locking means to break the circuit when the lateral doors are closed, a brace for the curtain, and means on the brace for breaking the circuit.

29. In combination with an airplane hangar having an entrance passageway, a curtain for closing the passageway, a motor including an electric circuit to raise and lower the curtain, a brace for the curtain, means to lock the brace in bracing position, and means operated by the lock means to break the circuit.

30. In combination with an airplane hangar having an entrance passageway, a curtain for closing the passageway, a motor including an electric circuit to raise and lower the curtain, a brace for the curtain, means to lock the brace in bracing position, and means operated by the lock means to break the circuit, said last-named means comprising a switch in the circuit and a push rod on the lock means.

31. In combination, a vertically movable curtain, vertically disposed guiding means for the edges of said curtain, removable posts located behind the curtain in the opening uncovered by the curtain adapted to additionally engage and guide the curtain in its lifting and lowering movements, and a traveling support for each post.

32. In combination, a vertically movable curtain, vertically disposed guiding means for the edges of said curtain, removable posts located behind the curtain in the opening uncovered by the curtain adapted to additionally engage and guide the curtain in its lifting and lowering movements, a traveling support for each post, and anti-friction means interposed between said posts and said curtain for facilitating said movements.

33. In combination, a vertically movable curtain, vertically disposed guiding means for the edges of said curtain, removable posts located behind the curtain in the opening uncovered by the curtain adapted to additionally engage and guide the curtain in its lifting and lowering movements, a traveling support for each post, and anti-friction means interposed between said posts and said curtain for facilitating said movements, said anti-friction means being adapted to travel with the curtain and upon the posts.

34. In combination, a vertically movable curtain, vertically disposed guiding means for the edges of said curtain, removable posts located behind the curtain in the opening uncovered by the curtain adapted to additionally engage and guide the curtain in its lifting and lowering movements, a traveling support for each post, anti-friction means interposed between said posts and said curtain for facilitating said movements, said antifriction means being adapted to travel with the curtain and upon the posts, and means to guide said posts from a point remote from the opening to points in the opening.

35. In combination, a vertically movable curtain, vertically disposed guiding means for the edges of said curtain, removable posts located behind the curtain in the opening uncovered by the curtain adapted to additionally engage and guide the curtain in its lifting and lowering movements, a traveling support for each post, anti-friction means interposed between said posts and said curtain for facilitating said movements, said anti-friction means being adapted to travel with the curtain and upon the posts, means to guide said posts from a point remote from the opening to points in the opening, and means to lock said posts in position.

36. In combination in a structure for withstanding abnormal wind pressures in exposed places and having an inclosure with an aperture, a steel curtain adapted to be moved vertically to open and close said aperture, said inclosure having a plurality of permanently open apertures of sufficient size, whereby to admit the external air pressure to a sufficient extent into the interior of the inclosure to counterbalance the external air pressure being applied to the curtain.

37. In combination in a structure for withstanding abnormal wind pressures in exposed places and having an inclosure with an aperture, a steel curtain adapted to be moved vertically to open and close said aperture, said inclosure having a plurality of permanently open apertures of sufficient size, whereby to admit the external air pressure to a sufficient extent into the interior of the inclosure to counterbalance the external air pressure being applied to the curtain, and means removably placeable in said aperture within the inclosure behind the curtain in engagement with the curtain and remote from the margins thereof to cooperate in resisting the air pressure on the curtain.

38. In combination in a structure for withstanding abnormal wind pressures in exposed places and having an inclosure with an aperture, a steel curtain adapted to be moved vertically to open and close said aperture, said inclosure having a plurality of permanently open apertures of sufficient size, whereby to admit the external air pressure to a sufficient extent into the interior of the inclosure to counterbalance the external air pressure being applied to the curtain, means removably placeable in said aperture within the inclosure behind the curtain in engagement with the curtain and remote from the margins thereof to cooperate in resisting the air pressure on the curtain, marginal guiding means adjacent the lateral margins of said aperture located in the walls of said inclosure adapted to receive the margins of said curtain to guide the margins, and means on said margins to prevent the withdrawal of the curtain margins from said guiding means.

39. In combination, an inclosure having an aperture, swinging panels pivoted at either side of said aperture for partially closing the aperture, guiding means in the vertical free margins of said panels, a vertically movable curtain adapted to be guided on its margins by said guiding means, means on the curtain in said guiding means to prevent the curtain from being withdrawn therefrom, and means for raising and lowering said curtain.

40. In combination, an inclosure having an aperture, swinging panels pivoted at either side of said aperture for partially closing the aperture, guiding means in the vertical free margins of said panels, a vertically movable curtain adapted to be guided on its margins by said guiding means, means on the curtain in said guiding means to prevent the curtain from being withdrawn therefrom, means for raising and lowering said curtain, and bracing means removable from a point to one side of said aperture to a point in the aperture adjacent said curtain adapted to engage with the curtain to prevent its inward movement at points remote from the margins of the aperture.

41. In combination, an inclosure having an aperture, swinging panels pivoted at either side of said aperture for partially closing the aperture, guiding means in the vertical free margins of said panels, a vertically movable curtain adapted to be guided on its margins by said guiding means, means on the curtain in said guiding means to prevent the curtain from being withdrawn therefrom, means for raising and lowering said curtain, bracing means removable from a point to one side of said aperture to a point in the aperture adjacent said curtain adapted to engage with the curtain to prevent its inward movement at points remote from the margins of the aperture, and anti-friction means on said last-mentioned means for facilitating the raising and lowering of the curtain.

42. In combination with an airplane hangar having an entrance passageway, a closure for the passageway comprising laterally disposed swinging doors, a suspended curtain member, means on the swinging doors to guide the curtain member, and door posts having recesses therein adapted to receive the swinging doors in their open positions.

EDWARD H. McCLOUD.